United States Patent
Zhou et al.

(10) Patent No.: US 9,380,446 B2
(45) Date of Patent: Jun. 28, 2016

(54) POLICY AND CHARGING CONTROL METHOD SUPPORTING IP FLOW MOBILITY IN ROAMING SCENARIO

(75) Inventors: Xiaoyun Zhou, Shenzhen (CN); Zaifeng Zong, Shenzhen (CN)

(73) Assignee: ZTE CORPORATION, Shenzhen, Guangdon Province (CN)

(*) Notice: Subject to any disclaimer, the term of this patent is extended or adjusted under 35 U.S.C. 154(b) by 387 days.

(21) Appl. No.: 13/882,591

(22) PCT Filed: Oct. 13, 2011

(86) PCT No.: PCT/CN2011/080730
§ 371 (c)(1),
(2), (4) Date: Apr. 30, 2013

(87) PCT Pub. No.: WO2012/058998
PCT Pub. Date: May 10, 2012

(65) Prior Publication Data
US 2013/0223290 A1   Aug. 29, 2013

(30) Foreign Application Priority Data

Nov. 5, 2010 (CN) .......................... 2010 1 0534700

(51) Int. Cl.
*H04W 8/02* (2009.01)
*H04W 8/08* (2009.01)
(Continued)

(52) U.S. Cl.
CPC .............. *H04W 8/02* (2013.01); *H04L 12/1407* (2013.01); *H04M 15/66* (2013.01);
(Continued)

(58) Field of Classification Search
None
See application file for complete search history.

(56) References Cited

U.S. PATENT DOCUMENTS

2008/0046963 A1* 2/2008 Grayson et al. ................... 726/1
2010/0124198 A1* 5/2010 Wong ................... H04W 60/005
                                                          370/329
(Continued)

FOREIGN PATENT DOCUMENTS

CN    101198171 A    6/2008
CN    101242655 A    8/2008
EP    1898591    *   3/2008    .............. H04L 29/06

OTHER PUBLICATIONS

Digital cellular telecommunications system (Phase 2+); Universal Mobile Telecommunications System (UMTS); LTE; Policy and Charging Control (PCC) over S9 reference point (3GPP TS 29.215 version 9.1.0 Release 9) (Jan. 2010).*

(Continued)

*Primary Examiner* — Michael Thier
*Assistant Examiner* — Eric Myers
(74) *Attorney, Agent, or Firm* — Harness, Dickey & Pierce, PLC

(57) ABSTRACT

A policy and charging control method for supporting IP flow mobility in a roaming scenario includes: when a Visited Policy and Charging Rules Function (V-PCRF) receives IP flow mobility routing rule information reported by a Policy and Charging Enforcement Function (PCEF), and if a Home Policy and Charging Rules Function (H-PCRF) subscribes to an IP-CAN type change (IP-CAN_CHANGE) event trigger or to an access node gateway change (AN_GW_CHANGE) event trigger, the V-PCRF reporting the IP flow mobility routing rule information to the H-PCRF. With the present method, a visited network can execute the IP flow mobility locally, or compared with a method in which an interaction with the H-PCRF is required at any time, signaling overhead between the V-PCRF and the H-PCRF can be saved.

20 Claims, 9 Drawing Sheets

(51) Int. Cl.
*H04W 8/14* (2009.01)
*H04W 4/24* (2009.01)
*H04W 36/00* (2009.01)
*H04L 12/14* (2006.01)
*H04M 15/00* (2006.01)

(52) U.S. Cl.
CPC ........... *H04M 15/8038* (2013.01); *H04W 4/24* (2013.01); *H04W 8/08* (2013.01); *H04W 8/14* (2013.01); *H04W 36/0022* (2013.01)

(56) References Cited

U.S. PATENT DOCUMENTS

| | | | |
|---|---|---|---|
| 2010/0146131 A1* | 6/2010 | Hu | H04L 12/14 709/228 |
| 2010/0291923 A1 | 11/2010 | Zhou et al. | |
| 2011/0170411 A1* | 7/2011 | Wang et al. | 370/235 |
| 2012/0210003 A1* | 8/2012 | Castro | H04L 12/14 709/225 |
| 2012/0314632 A1* | 12/2012 | Martinez De La Cruz | H04L 65/1046 370/310 |

OTHER PUBLICATIONS

Universal Mobile Telecommunications System (UMTS); LTE; Policy and charging control over Gx reference point (3GPP TS 29.212 version 8.4.0 Release 8) (Jun. 2009).*
3rd Generation Partnership Project; Technical Specification Group Services and System Aspects; Policy and charging control architecture; 3GPP TS 23.203 (Release 7) (Dec. 2008).*
International Search Report (in Chinese with English translation) for PCT/CN2011/080730, mailed Jan. 12, 2012; ISA/CN.

* cited by examiner

POLICY AND CHARGING CONTROL METHOD SUPPORTING IP FLOW MOBILITY IN ROAMING SCENARIO

CROSS-REFERENCE TO RELATED APPLICATIONS

This application is a 371 U.S. National Stage of International Application No. PCT/CN2011/080730, filed Oct. 13, 2011, and claims priority to Chinese patent application No. 201010534700.0, filed Nov. 5, 2010, the disclosures of which are herein incorporated by reference in their entirety.

TECHNICAL FIELD

The present document relates to the field of communication, and specifically, to a policy and charging control method and system for supporting IP flow mobility in a roaming scenario.

BACKGROUND OF THE RELATED ART

FIG. 1 is a schematic diagram of a system architecture of an Evolved Packet System (EPS) according to the related art, and as shown in FIG. 1, the EPS consists of an access network and an Evolved Packet Core (EPC), wherein, the access network can be an Evolved Universal Terrestrial Radio Access Network (E-UTRAN) and so on, and the EPC includes: a Mobility Management Entity (MME), a Serving Gateway (S-GW), a Packet Data Network Gateway (P-GW), a Home Subscriber Server (HSS), a 3rd Generation Partnership Project (3GPP) Authentication Authorization Accounting (AAA) server, a Policy and Charging Rules Function (PCRF) and other support nodes.

Wherein, the MME is responsible for works related to a control plane such as mobility management, non-access layer signaling processing and user context management and so on; the S-GW is an access node gateway device connected to the E-UTRAN, and it is responsible for forwarding data between the E-UTRAN and P-GW and for caching paging wait data; the P-GW is a border gateway between a 3rd Generation Partnership Project (3GPP) evolved packet system and a Packet Data Network (PDN), and it is responsible for accessing from a user terminal to the PDN and for forwarding data between the EPS and PDN and so on; and the PCRF is a policy and charging rules function entity and is connected to an operator Internet Protocol (IP) service network through a receiving interface Rx to acquire service information. Moreover, the PCRF is connected to gateway devices in the network through interfaces Gx/Gxa/Gxc, it takes charge of initiating an IP bearer establishment, guarantees the Quality of Service (QoS) of service data and performs charging control.

The EPS also supports a User Equipment (UE) performing accessing through other non-3GPP systems besides the E-UTRAN, wherein, the non-3GPP systems implement the access through interfaces S2a/b/c, and the P-GW serves as anchor points for the 3GPP system access and the non-3GPP system access. In the system architecture of the EPS, a non-3GPP system is divided into a trusted non-3GPP IP access network and an un-trusted non-3GPP IP access network. The trusted non-3GPP IP access network can be directly connected to the P-GW through the interface S2a; the un-trusted non-3GPP IP access network needs to be connected to the P-GW through an Evolved Packet Data Gateway (ePDG), and an interface between the ePDG and P-GW is the S2b. The S2c is an interface between the UE and P-GW, and it uses a Mobile Internet Protocol Vision (IPv6) Support for Dual Stack Hosts and Routers (DSMIPv6) protocol to provide the control and mobility management.

The EPS supports IP flow mobility. FIG. 2 is a schematic diagram of an access of the IP flow mobility in the related art, and as shown in FIG. 2, the UE is in the coverage of non-3GPP access (e.g. a Wireless Local Area Network (WLAN)) and 3GPP access (e.g. the E-UTRAN) simultaneously, and it is connected to the PDN through the same P-GW through a non-3GPP IP access network and a 3GPP IP access network. In this scenario, the UE is attached to the EPC through multiple access networks, the P-GW allocates an IP address to the UE, a PDN connection (also called as an IP-Connectivity Access Network (IP-CAN) session) exists between the UE and PDN. Since different services are applicable to be transmitted with different network, the IP flow mobility can select appropriate access network transmission services according to features of the services, and multiple access networks can share network loads, thereby avoiding network congestion. If a non-3GPP access network is the WLAN, service data flow of a Hypertext Transfer Protocol (Http) and a File Transfer Protocol (Ftp) can be sent to the UE through the WLAN, and service data flow of a Voice over IP (VoIP) can be sent to the UE through the 3GPP.

FIG. 3 is a flow diagram according to the related art, wherein a UE firstly establishes a PDN connection when accessing through a 3GPP access network and then establishes the same PDN connection through a non-3GPP access, and adopts the two accesses to use the PDN connection simultaneously. Dynamic Policy and Charging Control (PCC) is deployed in the network. In the figure, when it is performed through a trusted non-3GPP access, the UE uses a DSMIPv6 protocol, and as shown in FIG. 3, the method includes the following steps 301 to 316.

In step 301, the UE accesses an EPC through the 3GPP access network, wherein, a tunnel is established between an S-GW and P-GW through a General Packet Radio Service Tunneling Protocol (GTP) or a Proxy Mobile IPv6 (PMIPv6) protocol, and there are services which have been transmitted on the tunnel.

In step 302, the UE discovers a non-3GPP access network and decides to initiate multiple accesses. If the non-3GPP access network is trusted, the UE executes an access authentication and authorization in a trusted non-3GPP access network, and the UE executes a layer 3 attachment and obtains a local IP address (i.e. an IP address1) to serve as a Care of Address (CoA). If the non-3GPP access network is un-trusted, an Internet Protocol Security (IPSec) tunnel will be established between the UE and an ePDG, and in the tunnel establishment process, the ePDG allocates the IP address1 to the UE to serve as the CoA.

In step 303, a Bearer Binding and Event Reporting Function (BBERF) located in the trusted non-3GPP access network or ePDG sends gateway control session establishment message to a PCRF and requests for establishing a gateway control session, wherein a user identifier and the IP address1 are carried.

In step 304, the PCRF returns acknowledgement message to the BBERF.

In step 305, the UE discovers a P-GW selected during the 3GPP access through a bootstrapping process of the Mobile IPv6 (MIPv6). A security association is established between the UE and a PDN. The UE uses an Internet Key Exchange2 (IKEv2) to initiate a security association establishment. An Extensible Authentication Protocol (EAP) is used for an authentication on the IKEv2. The P-GW interacts with AAA to complete an EAP authentication. Moreover, in the process, the P-GW returns an IP Address2 allocated by the P-GW during the 3GPP access of the UE, the UE uses the IP address as a Home of Address (HoA) during the DSMIPv6 binding. At this point, the P-GW functions as a Home Agent (HA).

In step 306, the UE sends DSMIPv6 binding update message to P-GW/HA, the binding update message carries (HoA, CoA, Banding Identification (BID), Flow Identification (FID)). (HoA, CoA, BID, FID) are in a corresponding relationship.

Wherein, by the HoA taking a value of IP Address2 and the CoA taking a value of IP Address1, the binding update message indicates that a corresponding BID is a binding accessing through non-3GPP, and a certain data flow of user access service identified uniquely by the FID is bound to a connection accessing through non-3GPP.

By the HoA taking a value of IP Address2 and the CoA taking a value of IP Address2, the binding update message indicates that a corresponding BID is a binding accessing through 3GPP, and a service data flow identified by the FID is bound to a connection accessing through 3GPP.

If a flow binding is newly added, the corresponding relationship also includes Routing Filters (i.e. an IP quintuple) which are used for identifying a service data flow. A corresponding relationship is established between the FID and Routing Filters through the message, and a subsequent change of the service data flow can be represented by the FID. The UE reports a default routing rule in the message, that is, the Routing Filters are a wildcard filter.

The UE also can request for moving a Service Data Flow (SDF) transmitted through the 3GPP access to the non-3GPP access network.

In step 307, after receiving the binding update message, the P-GW/HA executes multi-registry flow binding according to parameters such as the HoA, CoA, BID, FID and Routing Filters carried in the message. That is, the P-GW maintains the GTP/PMIPv6 tunnels between the P-GW and S-GW and the DSMIPv6 tunnel between the P-GW and UE, and binds the service data flow to the 3GPP access or non-3GPP access. A Policy and Charging Enforcement Function (PCEF) located in the P-GW sends an Indication of IP-CAN session modification request to the PCRF, and the PCEF will send event trigger ROUTING_RULE_CHANGE and IP flow mobility routing rule information to the PCRF (with regard to the situation of newly adding and/or moving an IP flow in the flow, the IP flow mobility routing rule information is installing and/or modifying an IP flow mobility routing rule, the IP flow mobility routing rule is a corresponding relationship between the service data flow and the access, it is identified through a corresponding relationship between the Routing Filters and a Routing Address, when the Routing Address takes a value of IP Address1, it is indicated that it is accessed through non-3GPP, and when Routing Address takes a value of IP Address2, it is indicated that it is accessed through 3GPP). The message includes a default IP flow mobility routing rule, that is, the Routing Filters are a wildcard.

If the UE moves a certain service data flow from the 3GPP access to the non-3GPP access, the PCEF will provide an IP flow mobility routing rule corresponding to the service data flow to the PCRF, so as to inform the PCRF of the mobility which occurs in a route of the service data flow. In the routing rule, the Routing Filters are an IP quintuple of the service data flow, and the Routing Address takes a value of IP Address1.

In step 308, the PCRF installs and/or modifies the IP flow mobility routing rule. If the mobility (i.e. a mobility from the 3GPP access to the non-3GPP access) occurs in the service data flow corresponding to the IP flow mobility routing rule, the PCRF updates a PCC rule correspondingly and returns the updated PCC rule to the PCEF. With regard to an IP flow mobility routing rule newly installed by the PCRF, it may cause the service data flow corresponding to the IP flow mobility routing rule to move from a default route to a route designated by the IP flow mobility routing rule. With regard to an IP flow mobility routing rule changed by the PCRF, it may cause the service data flow corresponding to the IP flow mobility routing rule to move from a source routing path to a new routing path. In the flow, the PCC rule of the transmitted service data flow which moves from the 3GPP access to the non-3GPP access is updated and then returned to the PCEF.

In step 309, the P-GW/HA returns binding acknowledgement message to the UE, the message carries the HoA, CoA, BID and FID to acknowledge that the multi-registration flow binding of the UE is successful or the multi-registration flow binding and IP flow mobility are successful.

In step 310, if a certain service data flow moves from the 3GPP access to the non-3GPP access, the PCRF will make a QoS rule according to an updated PCC rule of the service data flow and provide the QoS rule to the BBERF in the trusted non-3GPP access network or ePDG.

In step 311, the non-3GPP access network executes a specific procedure to perform a resource allocation or modification.

In step 312, the BBERF returns acknowledgement message to the PCRF.

In step 313, if a certain service data flow moves from the 3GPP access to the non-3GPP access, and if the PMIPv6 tunnel is established between the S-GW and P-GW, the PCRF will delete the QoS rule corresponding to the service data flow. The PCRF provides a QoS rule required to be deleted to a BBERF in the S-GW through the gateway control session established during the UE accessing the 3GPP access network.

In step 314, the BBERF in the S-GW deletes the QoS rule, executes a 3GPP bearer modification procedure or a 3GPP bearer release procedure, and releases resources of a service data flow moved away.

In step 315, the BBERF returns acknowledgement message to the PCRF.

If a GTP tunnel is established between the S-GW and P-GW, the P-GW will initiate the 3GPP bearer modification procedure or the 3GPP bearer release procedure after the step 308 and release resources of the service data flow moved away. The steps 313-315 will not be executed.

In step 316, the UE completes the multi-registration flow binding and the possible flow mobility, the DSMIPv6 tunnel exists between the UE and P-GW/HA, and the GTP/PMIPv6 tunnels exist between the S-GW and P-GW. The UE or the network can decide an access through which service data are transmitted according to the policy.

FIG. 4 is a flow diagram according to the related art, wherein a UE firstly establishes a PDN connection when accessing through a non-3GPP access network and then establishes the same PDN connection through a 3GPP access, and adopts the two accesses to use the PDN connection simultaneously. Dynamic PCC is deployed in the network. In the figure, the UE uses a DSMIPv6 protocol during a trusted non-3GPP access, and as shown in FIG. 4, the method includes the following steps 401 to 413.

In step 401, the UE uses the DSMIPv6 protocol to access an EPC through the non-3GPP access network, wherein, a DSMIPv6 tunnel is established between the UE and P-GW/HA, and there are services which have been transmitted on the tunnel, wherein an address allocated by the non-3GPP access network to the UE is an IP Address1 serving as a CoA, and an IP address allocated by the P-GW to the UE is an IP Address2 serving as a HoA.

In step 402, the UE discovers a 3GPP access network and decides to initiate multiple accesses. The UE establishes a PDN connection to the same PDN through a 3GPP attachment flow, and in the establishment process, the IP address allocated by the P-GW to the UE is the IP Address2, so as to guarantee that the same PDN connection is established through different accesses.

In step 403, the UE sends DSMIPv6 binding update message to the P-GW/HA, the binding update message carries (HoA, CoA, BID, FID). (HoA, CoA, BID, FID) are in a corresponding relationship. By the HoA taking a value of IP Address2 and the CoA taking a value of IP Address1, the message indicates that a corresponding BID is a binding accessing through non-3GPP, and a certain data flow of user access service identified uniquely by the FID is bound to a connection accessing through non-3GPP. By the HoA taking a value of IP Address2 and the CoA taking a value of IP Address2, the message indicates that a corresponding BID is a binding accessing through 3GPP, and a service data flow identified by the FID is bound to a connection accessing through 3GPP. If a flow binding is newly added, the corresponding relationship also includes Routing Filters. A corresponding relationship is established between the FID and Routing Filters through the message, and a subsequent change of the service data flow can be represented by the FID. The UE may report a default routing rule in the message, that is, the Routing Filters are a wildcard filter. The UE also can request for moving a Service Data Flow (SDF) transmitted through the non-3GPP access to the 3GPP access network.

In step 404, after receiving the binding update message, the P-GW/HA executes multi-registration flow binding according to the carried parameters such as the HoA, CoA, BID, FID and Routing Filters. That is, the P-GW maintains the GTP/PMIPv6 tunnels between the P-GW and S-GW and the DSMIPv6 tunnel between the P-GW and UE, and binds the service data flow to the 3GPP access or non-3GPP access. A PCEF located in the P-GW sends an indication IP-CAN session modification request to the PCRF, and the PCEF will send event trigger ROUTING_RULE_CHANGE and IP flow mobility routing rule information to the PCRF (with regard to the situation of newly adding and/or moving an IP flow in the process, the IP flow mobility routing rule information is installing and/or modifying an IP flow mobility routing rule, the IP flow mobility routing rule is a corresponding relationship between the service data flow and the access, it is identified through a corresponding relationship between the Routing Filters and a Routing Address, when the Routing Address takes a value of IP Address1, it is indicated that it is accessed through non-3GPP, and when Routing Address takes a value of IP Address2, it is indicated that it is accessed through 3GPP). The message may include a default IP flow mobility routing rule, that is, the Routing Filters are a wildcard. If the UE moves a certain service data flow from the non-3GPP access to the 3GPP access, the PCEF will provide an IP flow mobility routing rule corresponding to the service data flow to the PCRF, so as to inform the PCRF of the mobility which occurs in a route of the service data flow. In the IP flow mobility routing rule, the Routing Filters are an IP quintuple of the service data flow, and the Routing Address takes a value of IP Address2.

In step 405, the PCRF installs and/or modifies the IP flow mobility routing rule. If the mobility (i.e. a mobility from the non-3GPP access to the 3GPP access) occurs in the service data flow corresponding to the IP flow mobility routing rule, the PCRF updates a corresponding PCC rule and returns the updated PCC rule to the PCEF. With regard to an IP flow mobility routing rule newly installed by the PCRF, it may cause the service data flow corresponding to the IP flow mobility routing rule to move from a default route to a route designated by the IP flow mobility routing rule. With regard to an IP flow mobility routing rule changed by the PCRF, it may cause the service data flow corresponding to the IP flow mobility routing rule to move from a source routing path to a new routing path. In the flow, the PCC rule of the service data flow which moves from the non-3GPP access to the 3GPP access is updated and then returned to the PCEF.

In step 406, the P-GW/HA returns binding acknowledgement message to the UE, the message carries the HoA, CoA, BID and FID to acknowledge that the multi-registration flow binding of the UE is successful or the multi-registration flow binding and IP flow mobility are successful.

In step 407, if a certain service data flow moves from the non-3GPP access to the 3GPP access, and if the PMIPv6 tunnel is established between the S-GW and P-GW, the PCRF will make a QoS rule according to an updated PCC rule of the service data flow and provide the QoS rule to a BBERF in the S-GW.

In step 408, the BBERF installs the QoS rule, and the S-GW initiates and executes a 3GPP bearer modification procedure or a 3GPP bearer establishment procedure to perform a resource allocation or modification.

In step 409, the BBERF returns acknowledgement message to the PCRF.

If the GTP tunnel is established between the S-GW and P-GW, the P-GW will initiate the 3GPP bearer modification procedure or the 3GPP bearer establishment procedure after the step 405 and allocate resources of a service data flow moved in. The steps 407-409 will not be executed.

In step 410, if a certain service data flow moves from the non-3GPP access to the 3GPP access, the PCRF will delete the QoS rule corresponding to the service data flow in the non-3GPP access network or ePDG. The PCRF provides a QoS rule required to be deleted to a BBERF in the non-3GPP access network or ePDG through a gateway control session established during the UE accessing the non-3GPP access network.

In step 411, the BBERF deletes the QoS rule, initiates and executes a specific non-3GPP resource modification procedure or a specific non-3GPP resource release procedure.

In step 412, the BBERF returns acknowledgement message to the PCRF.

In step 413, the UE completes the multi-registration flow binding and the flow mobility, the DSMIPv6 tunnel exists between the UE and P-GW/HA, and the GTP/PMIPv6 tunnels exist between the S-GW and P-GW. The UE or the network can decide an access through which service data are transmitted according to the policy.

FIG. 5 is a flow diagram according to the related art, wherein a UE performs data flow mobility between two access networks after implementing the multi-registry flow binding through the flow of FIG. 3 or FIG. 4. Dynamic PCC is deployed in the network. As shown in FIG. 5, the method includes the following steps 501 to 511.

In step 501, the UE is connected to a 3GPP access or a non-3GPP access simultaneously through the flow of FIG. 3 or FIG. 4 and performs multi-registration flow binding.

In step 502, the UE sends DSMIPv6 binding update message to P-GW/HA, and the binding update message carries (HoA, BID, FID). In the message, the UE can request for moving a Service Data Flow (SDF) transmitted through the non-3GPP access (represented as the FID) to a 3GPP access network (represented as the BID) or vice versa (that is, a routing rule is changed). The UE also can request for deleting the routing rule or adding a new routing rule. If a routing rule is newly added, the message also includes Routing Filters.

In step 503, after receiving the binding update message, the P-GW/HA executes flow binding updates including flow mobility, new addition or deletion and so on according to the carried parameters such as the HoA, BID and FID. A PCEF located in the P-GW sends an Indication of IP-CAN session modification request to the PCRF, and the PCEF will send event trigger ROUTING_RULE_CHANGE and IP flow mobility routing rule information which includes installing, modifying and/or removing an IP flow mobility routing rule to the PCRF. In the routing rule, an IP Address1 is adopted to indicate that an access network performing transmission currently is of non-3GPP, and an IP Address2 is adopted to indicate that an access network performing transmission currently is of 3GPP. The Routing Filters are adopted to indicate service data flows.

In step 504, the PCRF installs, modifies and/or removes the IP flow mobility routing rule. The PCRF updates a PCC rule according to the IP flow mobility routing rule. With regard to an IP flow mobility routing rule newly installed by the PCRF, it may cause a service data flow corresponding to the IP flow mobility routing rule to move from a default route to a route designated by the IP flow mobility routing rule. With regard to an IP flow mobility routing rule changed by the PCRF, it may cause the service data flow corresponding to the IP flow mobility routing rule to move from a source routing path to a new routing path. With regard to an IP flow mobility routing rule deleted by the PCRF, it may cause the service data flow corresponding to the IP flow mobility routing rule to move from the source routing path to a path of the default routing rule.

In step 505, the P-GW/HA returns binding acknowledgement message to the UE, and the message carries the HoA, BID and FID to acknowledge that the routing rule of the UE is updated successfully.

In step 506, if a PMIPv6 tunnel is established between the S-GW and P-GW, the PCRF will install or delete a QoS rule on a BBERF in the S-GW according to the rule reported by the PCEF. If it is to move from the non-3GPP to the 3GPP, the QoS rule is installed, and conversely, the QoS rule is deleted.

In step 507, the BBERF installs or deletes the QoS rule, and the S-GW initiates and executes a 3GPP bearer establishment procedure, a 3GPP bearer modification procedure or a 3GPP bearer deletion flow to perform a resource allocation, modification or release.

In step 508, the BBERF returns acknowledgement message to the PCRF.

If a GTP tunnel is established between the S-GW and P-GW, the P-GW will initiate the 3GPP bearer establishment procedure, 3GPP bearer modification procedure or 3GPP bearer deletion flow after the step 504. The steps 506-508 will not be executed.

In step 509, the PCRF will install or delete a QoS rule on a BBERF in a trusted non-3GPP access network or ePDG according to the rule reported by the PCEF. If it is to move from the 3GPP to the non-3GPP, the QoS rule is installed, and conversely, the QoS rule is deleted.

In step 510, the BBERF installs or deletes the QoS rule, and a specific non-3GPP resource allocation procedure, a specific non-3GPP resource modification procedure or a specific non-3GPP resource release procedure is initiated and executed.

In step 511, the BBERF returns acknowledgement message to the PCRF.

It can be seen from the above flows that, when the policy and charging control of the IP flows is executed, the PCEF provides a routing rule indicating a transmission path of the service data flow to the PCRF, the PCRF determines an access network in which the service data flow is transmitted currently according to the routing rule, and allocates resources to the service data flow in the current access network. If the mobility occurs in the service data flow, the resources allocated to the service data flow are still released in a source access network.

In the related art, the IP flow mobility routing rule includes the following 4 parts:

a rule identifier: it is used for uniquely identifying a routing rule in an IP-CAN session;

a routing filter: it is used for identifying a service data flow;

a priority: it is used for identifying a priority level of the routing rule;

a routing address: it is used for identifying an access network in which the service data flow is transmitted currently, such as the IP Address1 and IP Address2 as shown in FIG. 3, FIG. 4 and FIG. 5.

The IP flow mobility routing rule includes 3 kinds of operations: installation, modification and removal. The operations of installation and modification need to carry contents of the IP flow mobility rule, need to include the rule identifier, and also need to include at least one of the routing filter, priority and routing address. During the operation of removal, it can only carry the rule identifier.

In the related art, a support is provided to the method for policy control of the IP flow mobility in a non-roaming scenario, but there is no complete solution with respect to how to support the policy control of the IP flow mobility in a roaming scenario. Especially with respect to a policy and charging control method for supporting IP flow mobility in a Visited Access (VA) (also called as Local Breakout) roaming scenario (as shown in FIG. 6), how to optimize the policy and charging control better is a problem to be solved.

SUMMARY OF THE INVENTION

The technical problem required to be solved by the present document is to provide a policy and charging control method and system for supporting IP flow mobility in a roaming scenario.

In order to solve the above problem, the present document provides a policy and charging control method for supporting IP flow mobility in a roaming scenario, which comprises:

when a Visited Policy and Charging Rules Function (V-PCRF) receives IP flow mobility routing rule information reported by a Policy and Charging Enforcement Function (PCEF), and if a Home Policy and Charging Rules Function (H-PCRF) subscribes to an IP-CAN type change (IP-CAN_CHANGE) event trigger or to an access node gateway change (AN_GW_CHANGE) event trigger, the V-PCRF reporting the IP flow mobility routing rule information to the H-PCRF, and the IP flow mobility routing rule information including: installing, modifying or removing an IP flow mobility routing rule.

Preferably, the above method can further be characterized in that, after receiving the IP flow mobility routing rule information, the V-PCRF executes one or more of the following operations: installing, modifying or removing the IP flow mobility routing rule carried in the IP flow mobility routing rule information.

Preferably, the above method can further be characterized in that, the method further comprises:

in an IP-Connectivity Access Network (IP-CAN) session establishment process, after receiving the IP flow mobility routing rule information, the H-PCRF installing the IP flow mobility routing rule carried in the IP flow mobility routing rule information.

Preferably, the above method can further be characterized in that, in an IP-CAN session modification process, when reporting the IP flow mobility routing rule information to the H-PCRF, the V-PCRF further reports ROUTING_RULE_CHANGE event trigger to the H-PCRF.

Preferably, the above method can further be characterized in that, the method further comprises:

in the IP-CAN session modification process, after receiving the IP flow mobility routing rule information, the H-PCRF executing one or more of the following operations: installing, modifying or removing the IP flow mobility routing rule carried in the IP flow mobility routing rule information.

Preferably, the above method can further be characterized in that, the method further comprises:

after installing, modifying or removing the IP flow mobility routing rule, if the mobility occurs in a service data flow corresponding to the IP flow mobility routing rule, the H-PCRF updating a Policy and Charging Control (PCC) rule, and sending the updated PCC rule to the V-PCRF;

the V-PCRF sending the updated PCC rule to the PCEF.

Preferably, the above method can further be characterized in that, the method further comprises:

the V-PCRF making a Quality of Service (QoS) rule according to the updated PCC rule, and sending the QoS rule to a specified Bearer Binding and Event Reporting Function (BBERF) according to the IP flow mobility routing rule.

Preferably, the above method can further be characterized in that, the method further comprises:

the V-PCRF deleting a QoS rule corresponding to the service data flow from a BBERF through which the service data flow passes before the mobility.

Preferably, the above method can further be characterized in that, the method further comprises: if the H-PCRF does not subscribe to the IP-CAN_CHANGE event trigger or the AN_GW_CHANGE event trigger, the V-PCRF handling the IP flow mobility locally.

Preferably, the above method can further be characterized in that, the V-PCRF processing the IP flow mobility locally comprises:

if the mobility occurs in the service data flow corresponding to the IP flow mobility routing rule, the V-PCRF making a QoS rule according to a PCC rule corresponding to the IP flow mobility routing rule, and sending the QoS rule to a specified BBERF according to the IP flow mobility routing rule.

Preferably, the above method can further be characterized in that, the V-PCRF handling the IP flow mobility locally further comprises:

the V-PCRF deleting the QoS rule corresponding to the service data flow from the BBERF through which the service data flow passes before the mobility.

The present document further provides a policy and charging control system for supporting IP flow mobility in a roaming scenario, which comprises: a Visited Policy and Charging Rules Function (V-PCRF) and a Home Policy and Charging Rules Function (H-PCRF), wherein:

the V-PCRF is configured to: when receiving IP flow mobility routing rule information reported by a Policy and Charging Enforcement Function (PCEF), and if the H-PCRF subscribes to an IP-CAN type change (IP-CAN_CHANGE) event trigger or to an access node gateway change (AN_GW_CHANGE) event trigger, report the IP flow mobility routing rule information to the H-PCRF, and the IP flow mobility routing rule information includes: installing, modifying or removing an IP flow mobility routing rule.

Preferably, the above system can further be characterized in that, the V-PCRF is further configured to: after receiving the IP flow mobility routing rule information, execute one or more of the following operations: installing, modifying or removing the IP flow mobility routing rule carried in the IP flow mobility routing rule information.

Preferably, the above system can further be characterized in that, the H-PCRF is further configured to: in an IP-Connectivity Access Network (IP-CAN) session establishment process, after receiving the IP flow mobility routing rule information, install the IP flow mobility routing rule carried in the IP flow mobility routing rule information.

Preferably, the above system can further be characterized in that, the V-PCRF is further configured to: in an IP-CAN session modification process, when reporting the IP flow mobility routing rule information to the H-PCRF, report ROUTING_RULE_CHANGE event trigger to the H-PCRF.

Preferably, the above system can further be characterized in that, the H-PCRF is further configured to: in the IP-CAN session modification process, after receiving the IP flow mobility routing rule information, execute one or more of the following operations: installing, modifying or removing the IP flow mobility routing rule carried in the IP flow mobility routing rule information.

Preferably, the above system can further be characterized in that, the H-PCRF is further configured to: after installing or modifying the IP flow mobility routing rule, if the mobility occurs in a service data flow corresponding to the IP flow mobility routing rule, update a PCC rule, and send the updated PCC rule to the V-PCRF;

the V-PCRF is further configured to: send the updated PCC rule to the PCEF.

Preferably, the above system can further be characterized in that, the V-PCRF is further configured to: make a QoS rule according to the updated PCC rule, and send the QoS rule to a specified BBERF according to the IP flow mobility routing rule.

Preferably, the above system can further be characterized in that, the V-PCRF is further configured to: delete a QoS rule corresponding to the service data flow from a BBERF through which the service data flow passes before the mobility.

Preferably, the above system can further be characterized in that, the V-PCRF is further configured to: if the H-PCRF does not subscribe to the IP-CAN_CHANGE event trigger or the AN_GW_CHANGE event trigger, handles the IP flow mobility locally.

Preferably, the above system can further be characterized in that, the V-PCRF handling the IP flow mobility locally comprises: if the mobility occurs in the service data flow corresponding to the IP flow mobility routing rule, the V-PCRF making a QoS rule according to a PCC rule corresponding to the IP flow mobility routing rule, and sending the QoS rule to a specified BBERF according to the IP flow mobility routing rule.

Preferably, the above system can further be characterized in that, the V-PCRF handling the IP flow mobility locally further comprises: deleting the QoS rule corresponding to the service data flow from the BBERF through which the service data flow passes before the mobility.

The present document further provides a Visited Policy and Charging Rules Function (V-PCRF), the V-PCRF is configured to: when receiving IP flow mobility routing rule information reported by a Policy and Charging Enforcement Function (PCEF), and if a Home Policy and Charging Rules Function (H-PCRF) subscribes to an IP-CAN type change (IP-CAN_CHANGE) event trigger or to an access node gateway change (AN_GW_CHANGE) event trigger, report the IP flow mobility routing rule information to the H-PCRF, and the IP flow mobility routing rule information includes: installing, modifying or removing an IP flow mobility routing rule.

Preferably, the V-PCRF is further configured to: after receiving the IP flow mobility routing rule information, execute one or more of the following operations: installing, modifying or removing the IP flow mobility routing rule carried in the IP flow mobility routing rule information.

Preferably, the V-PCRF is further configured to: in an IP-CAN session modification process, when reporting the IP flow mobility routing rule information to the H-PCRF, report ROUTING_RULE_CHANGE event trigger to the H-PCRF.

Preferably, the V-PCRF is further configured to: send an updated PCC rule to the PCEF;

after the H-PCRF installs or modifies the IP flow mobility routing rule, and if the mobility occurs in a service data flow corresponding to the IP flow mobility routing rule, the updated PCC rule is obtained by the H-PCRF updating a PCC rule; and the H-PCRF sends the updated PCC rule to the V-PCRF.

Preferably, the V-PCRF is further configured to: make a QoS rule according to the updated PCC rule, and send the QoS rule to a specified BBERF according to the IP flow mobility routing rule.

Preferably, the V-PCRF is further configured to: delete a QoS rule corresponding to the service data flow from a BBERF through which the service data flow passes before the mobility.

Preferably, the V-PCRF is further configured to: if the H-PCRF does not subscribe to the IP-CAN_CHANGE event trigger or the AN_GW_CHANGE event trigger, handles the IP flow mobility locally.

Preferably, the V-PCRF handling the IP flow mobility locally comprises: if the mobility occurs in the service data flow corresponding to the IP flow mobility routing rule, the V-PCRF making a QoS rule according to a PCC rule corresponding to the IP flow mobility routing rule, and sending the QoS rule to a specified BBERF according to the IP flow mobility routing rule.

Through the examples of the present document, it can implement the following beneficial effects:

1) when the H-PCRF does not support the IP flow mobility, and if the H-PCRF does not subscribe to the IP-CAN_CHANGE or the AN_GW_CHANGE, a visited network can handle the IP flow mobility locally;

2) when the H-PCRF supports the IP flow mobility, and if the H-PCRF does not subscribe to the IP-CAN_CHANGE or the AN_GW_CHANGE, the V-PCRF is not required to interact with the H-PCRF, compared with a scheme that it is required to perform an interaction with the H-PCRF at any time, it can save a signaling overhead between the V-PCRF and the H-PCRF.

BRIEF DESCRIPTION OF DRAWINGS

Here, the described accompanying drawings are used to provide a further understanding of the present document and constitute a part of the present document. The schematic examples and illustrations thereof of the present document are used to explain the present document, but do not constitute an inappropriate limitation on the present document. In the drawings.

PREFERRED EMBODIMENTS OF THE INVENTION

Figure 1:
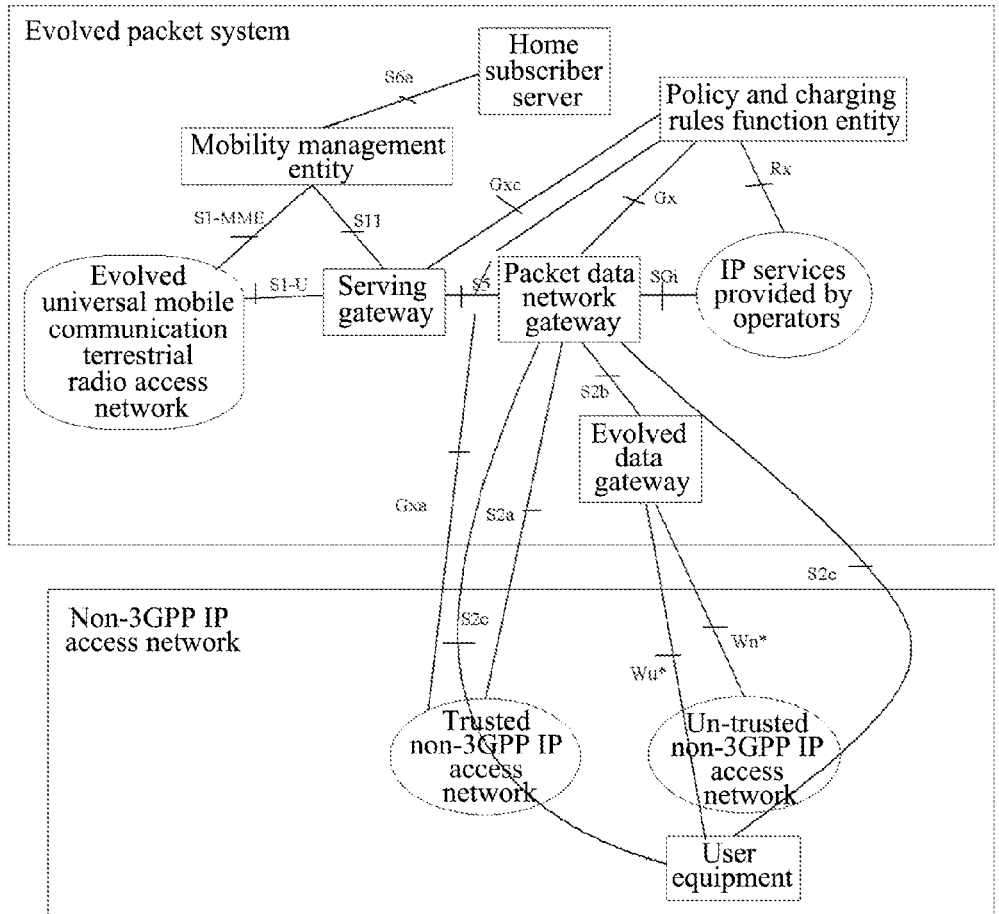
FIG. 1 is a schematic diagram of a system architecture of an EPS according to the related art.
Figure 2:
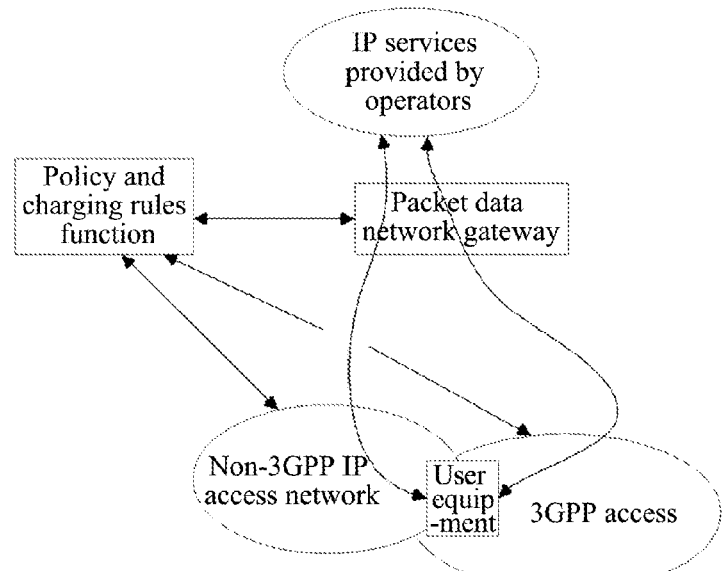
FIG. 2 is a schematic diagram of an access of the IP flow mobility according to the related art.
Figure 3:
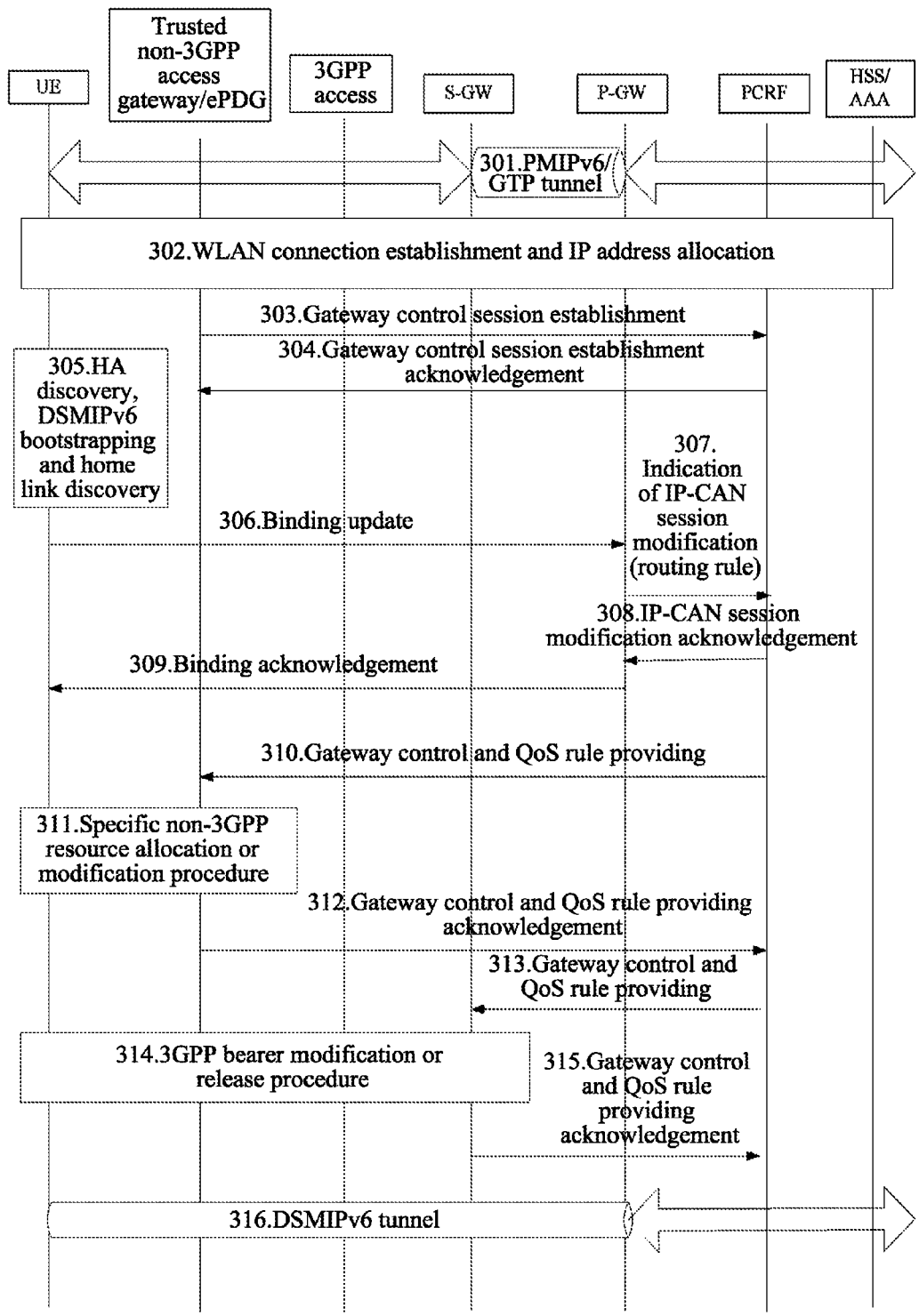
FIG. 3 is a flow diagram 1 of establishing an IP flow mobility connection in a non-roaming scenario according to the related art.
Figure 4:
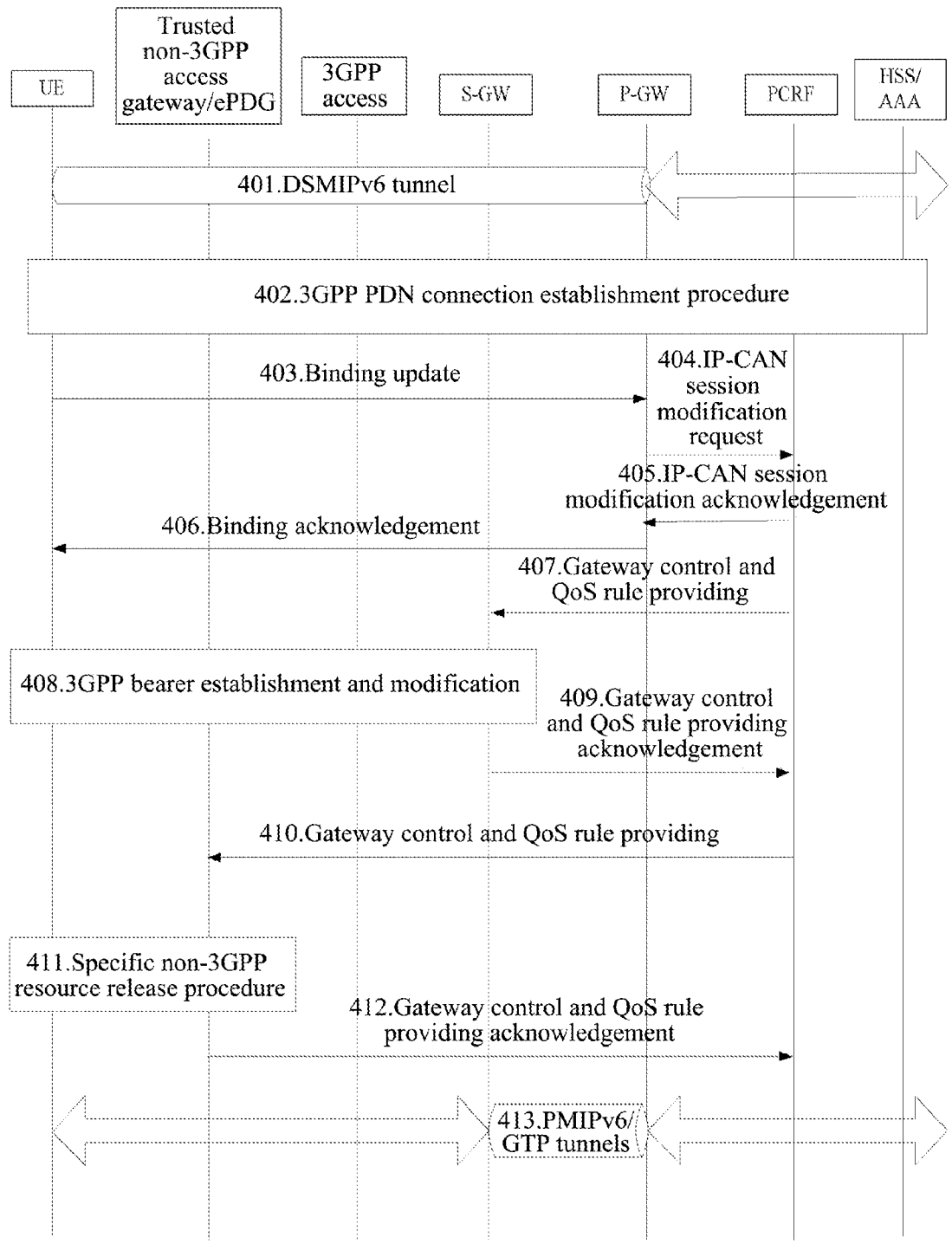
FIG. 4 is a flow diagram 2 of establishing an IP flow mobility connection in a non-roaming scenario according to the related art.
Figure 5:
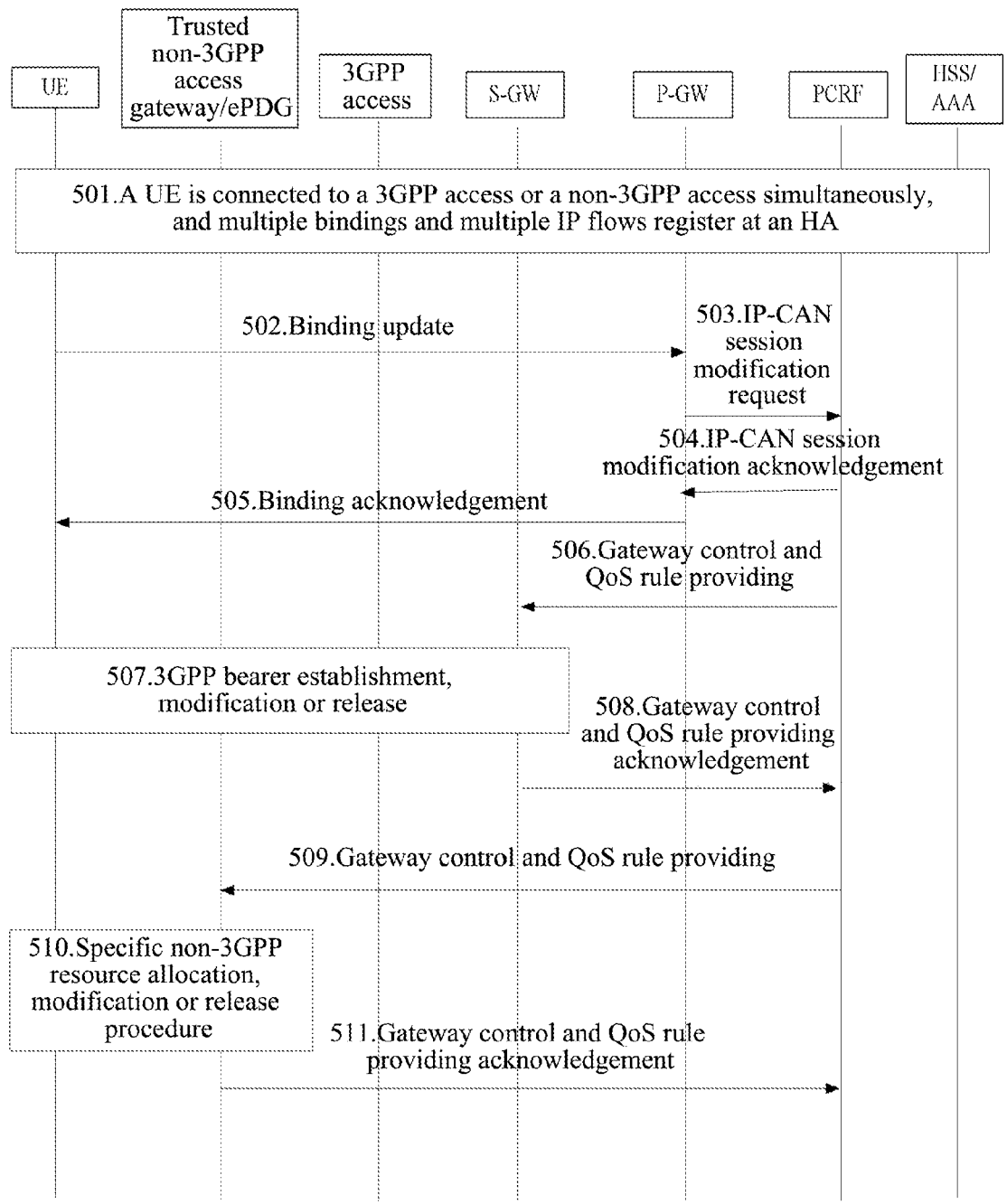
FIG. 5 is a flow diagram of implementing the IP flow mobility in a non-roaming scenario according to the related art.
Figure 6:
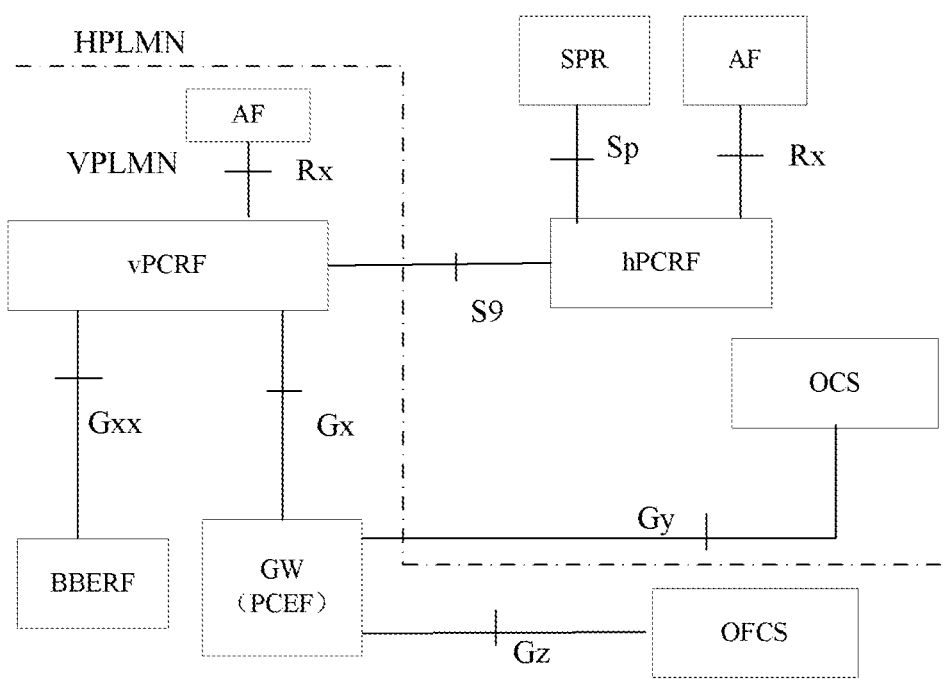
FIG. 6 is a PCC architecture in a visited access scenario in the related art.

The examples of the present document will be described in detail in combination with the accompanying drawings below. It should be noted that the examples in the present document and the characteristics in the examples can be optionally combined with each other in the condition of no conflict.

The present document is disclosed with respect to the policy and charging control supporting the IP flow mobility in a local breakout roaming scenario.

The present document provides a policy and charging control method for supporting IP flow mobility in a roaming scenario, which comprises:

when a Visited Policy and Charging Rules Function (V-PCRF) receives IP flow mobility routing rule information reported by a Policy and Charging Enforcement Function (PCEF), if a Home Policy and Charging Rules Function (H-PCRF) subscribes to an IP-CAN Type Change (IP-CAN_CHANGE) event trigger or to an Access Node Gateway Change (AN_GW_CHANGE) event trigger, the V-PCRF reporting the IP flow mobility routing rule information to the H-PCRF;

if the H-PCRF does not subscribe to the IP-CAN_CHANGE event trigger or the AN_GW_CHANGE event trigger, the V-PCRF handling the IP flow mobility locally;

the IP flow mobility routing rule information including: installing, modifying or removing an IP flow mobility routing rule.

Furthermore, after receiving the IP flow mobility routing rule information, the V-PCRF executes one or more of the following operations: installing, modifying or removing the IP flow mobility routing rule carried in the IP flow mobility routing rule information.

Furthermore, reporting the IP flow mobility routing rule information falls into two situations:

1) In an IP-Connectivity Access Network (IP-CAN) session establishment process, after receiving the IP flow mobility routing rule information, the H-PCRF installs the IP flow mobility routing rule carried in the IP flow mobility routing rule information;

2) In an IP-CAN session modification process, when reporting the IP flow mobility routing rule information to the H-PCRF, the V-PCRF reports ROUTING_RULE_CHANGE event trigger to the H-PCRF.

After receiving the IP flow mobility routing rule information, the H-PCRF executes one or more of the following operations: installing, modifying or removing the IP flow mobility routing rule carried in the IP flow mobility routing rule information;

after installing, modifying or removing the IP flow mobility routing rule, if the mobility occurs in a service data flow corresponding to the IP flow mobility routing rule, the H-PCRF updates a PCC rule, and sends the updated PCC rule to the V-PCRF;

the V-PCRF sends the updated PCC rule to the PCEF;

the V-PCRF makes a QoS rule according to the updated PCC rule, and sends the QoS rule to a specified BBERF according to the IP flow mobility routing rule; and the V-PCRF deletes a QoS rule corresponding to the service data flow from a BBERF through which the service data flow passes before the mobility.

Furthermore, the V-PCRF handling the IP flow mobility locally includes:

if the mobility occurs in the service data flow corresponding to the IP flow mobility routing rule, the V-PCRF making a QoS rule according to a PCC rule corresponding to the IP flow mobility routing rule, and sending the QoS rule to a specified BBERF according to the IP flow mobility routing rule;

the V-PCRF deleting the QoS rule corresponding to the service data flow from the BBERF through which the service data flow passes before the mobility.

Example 1

Figure 7:
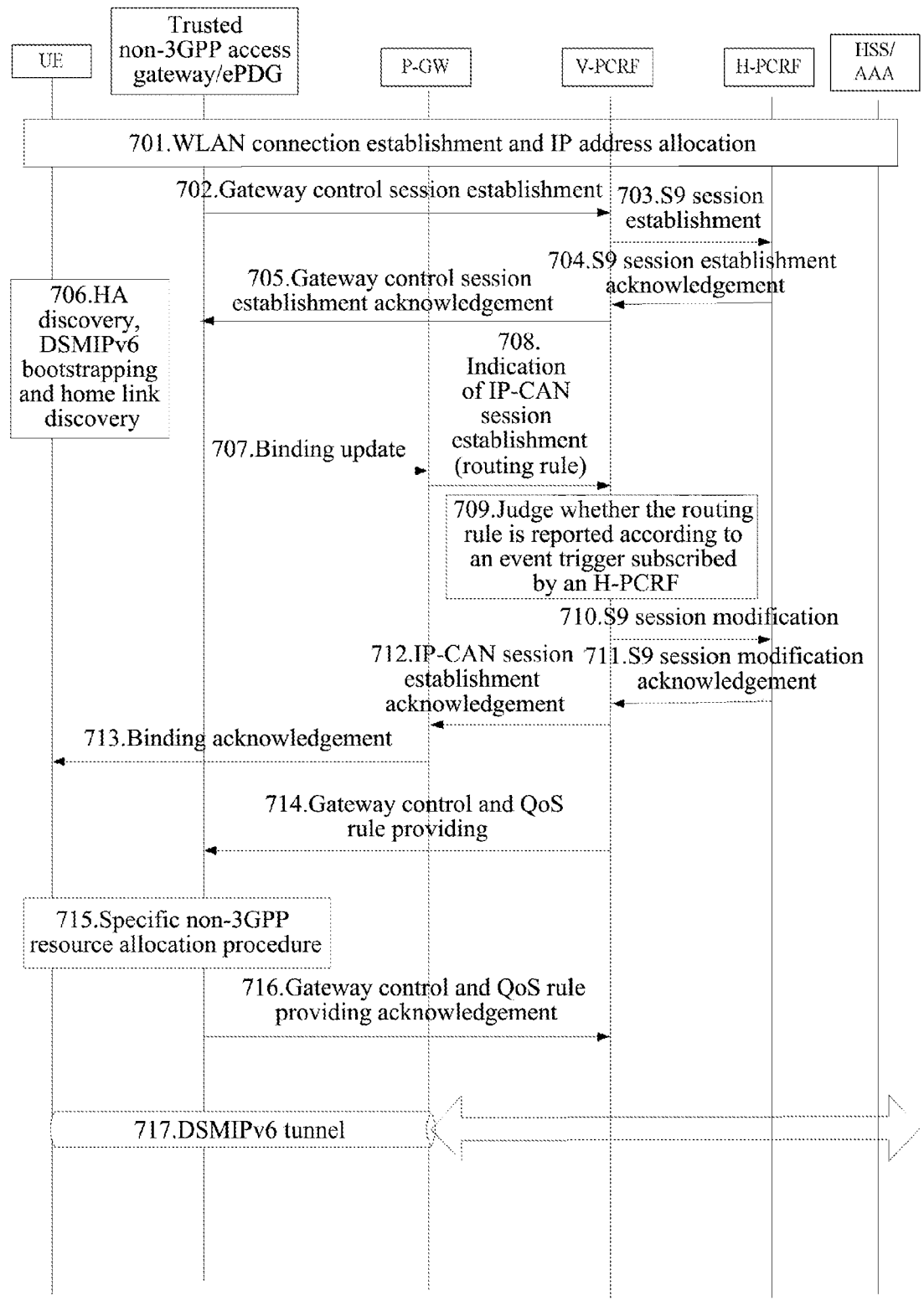
FIG. 7 is a flow diagram of the example 1 of the present document.

FIG. 7 is a flow diagram of a UE performing an initial attachment through a non-3GPP access network according to the example 1 of the present document, wherein, the UE uses a DSMIPv6 protocol when accessing through a trusted non-3GPP access network.

In step 701, the UE discovers the non-3GPP access network and initiates an attachment. If the non-3GPP access network is trusted, the UE executes an access authentication and authorization in a trusted non-3GPP access network, and the UE executes a layer 3 attachment and obtains a local IP address (i.e. an IP address 1) to serve as a CoA. If the non-3GPP access network is un-trusted, the UE will establish an IPSec tunnel with an ePDG and performs a tunnel authentication, and in the tunnel establishment process, the ePDG allocates the IP address1 to the UE to serves as the CoA.

In step 702, a BBERF located in the trusted non-3GPP access network or ePDG sends gateway control session establishment message to a V-PCRF to request for establishing a gateway control session, and the message carries a user identifier and the IP address1.

In step 703, the V-PCRF determines that the user is a roaming user according to the user identifier, and determines that the user has not a corresponding S9 session, and the V-PCRF initiates an S9 session establishment to an H-PCRF, wherein the user identifier and the IP address1 are carried.

In step 704, if the H-PCRF has no subscription data related to the user, the H-PCRF is required to interact with a Subscriber Profile Repository (SPR) to acquire the subscription data of the user. The H-PCRF makes a policy according to the subscription data and network policies and so on. Since there is no PDN identifier information at the point, the policy made by the H-PCRF will not aim at a certain PDN. The policy made by the H-PCRF may include a QoS rule and an event trigger. The H-PCRF returns S9 session establishment acknowledgment message to the V-PCRF, wherein the QoS rule and event trigger may be carried.

In step 705, the V-PCRF returns gateway control session establishment acknowledgment message to the BBERF, wherein the QoS rule and event trigger may be carried.

In step 706, the UE discovers a P-GW selected during the 3GPP access through a bootstrapping process of the Mobile IPv6 (MIPv6). A security association is established between the UE and the PDN. The UE uses an IKEv2 to initiate a security association establishment. An EAP is used for authentication on the IKEv2. The P-GW interacts with AAA to complete an EAP authentication. Moreover, in the process, the P-GW returns an IP Address2 allocated by the P-GW during the 3GPP access of the UE, and the UE uses the IP address2 as an HoA during the DSMIPv6 binding. At this point, the P-GW functions as a HA.

In step 707, the UE sends DSMIPv6 binding update message to the P-GW/HA, the binding update message carries (HoA, CoA, BID, FID, Routing Filters) routing rules. A corresponding relationship includes a default routing rule, that is, the Routing Filters are a wildcard filter, the HoA takes a value of the IP Address2, and the CoA takes a value of the IP Address1.

In step 708, after receiving the binding update message, the P-GW/HA executes multi-registration flow binding according to the carried (HoA, CoA, BID, FID, Routing Filters). A PCEF located in the P-GW sends an indication of IP-CAN session establishment to the V-PCRF, and the PCEF will send IP flow mobility routing rule information to the V-PCRF, with regard to the flow, the IP flow mobility routing rule information includes installing an IP flow mobility routing rule, and the IP flow mobility routing rule information includes a default routing rule. These routing rules include a corresponding relationship (of IP Address1, Routing Filters) (since there is only one access network namely the non-3GPP access network currently).

In step 709, the V-PCRF installs the IP flow mobility routing rule carried in the IP flow mobility routing rule information. The V-PCRF judges whether it is required to report the IP flow mobility routing rule information to the H-PCRF according to the event trigger subscribed by the H-PCRF previously. If the H-PCRF subscribes to an IP-CAN type change event trigger or to an access node gateway change event trigger, the V-PCRF is required to report the IP flow mobility routing rule information to the H-PCRF; otherwise the V-PCRF does not report the IP flow mobility routing rule information to the H-PCRF, but performs local handling of the visited network.

Wherein, the IP-CAN type change is represent as IP-CAN_CHANGE, the access node gateway change is represent as AN_GW_CHANGE, when the values in the event trigger sent in the step 704 include the IP-CAN_CHANGE or the AN_GW_CHANGE (that is, the H-PCRF subscribes to an IP-CAN_CHANGE event trigger or to an AN_GW_CHANGE event trigger), the V-PCRF is required to report the IP flow mobility routing rule information to the H-PCRF; otherwise the V-PCRF does not report the IP flow mobility routing rule information to the H-PCRF but performs local handling of the visited network; wherein, in the example, the IP-CAN types include 3GPP-EPS and Non-3GPP-EPS, and the access node gateways include a trusted non-3GPP IP access network, S-GW and ePDG.

In step 710, the V-PCRF sends S9 session modification message to the H-PCRF and requests for establishing an S9 Subsession, information such as the IP Address2 and a corresponding PDN identifier and so on is carried in the Subsession. If determining that it is required to report the IP flow mobility routing rule information in step 709, the IP flow mobility routing rule information is included into the Subsession by the V-PCRF to be sent to the H-PCRF, otherwise the V-PCRF does not send the IP flow mobility routing rule information to the H-PCRF.

In step 711, the H-PCRF installs the IP flow mobility routing rule carried in the IP flow mobility routing rule information. The H-PCRF makes a PCC rule according to the user subscription data and network policies, and sends the PCC rule to the V-PCRF through the Subsession.

In step 712, the V-PCRF returns acknowledgement message including the PCC rule to the PCEF.

In step 713, the P-GW/HA returns binding acknowledgement message to the UE, the message carries the HoA, CoA, BID and FID to acknowledge that the multi-registry flow binding of the UE is successful.

In step 714, the V-PCRF makes a QoS rule according to the PCC rule sent in the step 711, and provides the QoS rule to the BBERF in the trusted non-3GPP access network or ePDG.

In step 715, the BBERF installs the QoS rule, initiates a specific procedure of the non-3GPP access network to allocate resources.

In step 716, the BBERF returns acknowledgement message to the V-PCEF.

In step 717, the UE completes the multi-registration flow binding, and a DSMIPv6 tunnel exists between the UE and P-GW/HA.

Example 2

Figure 8:
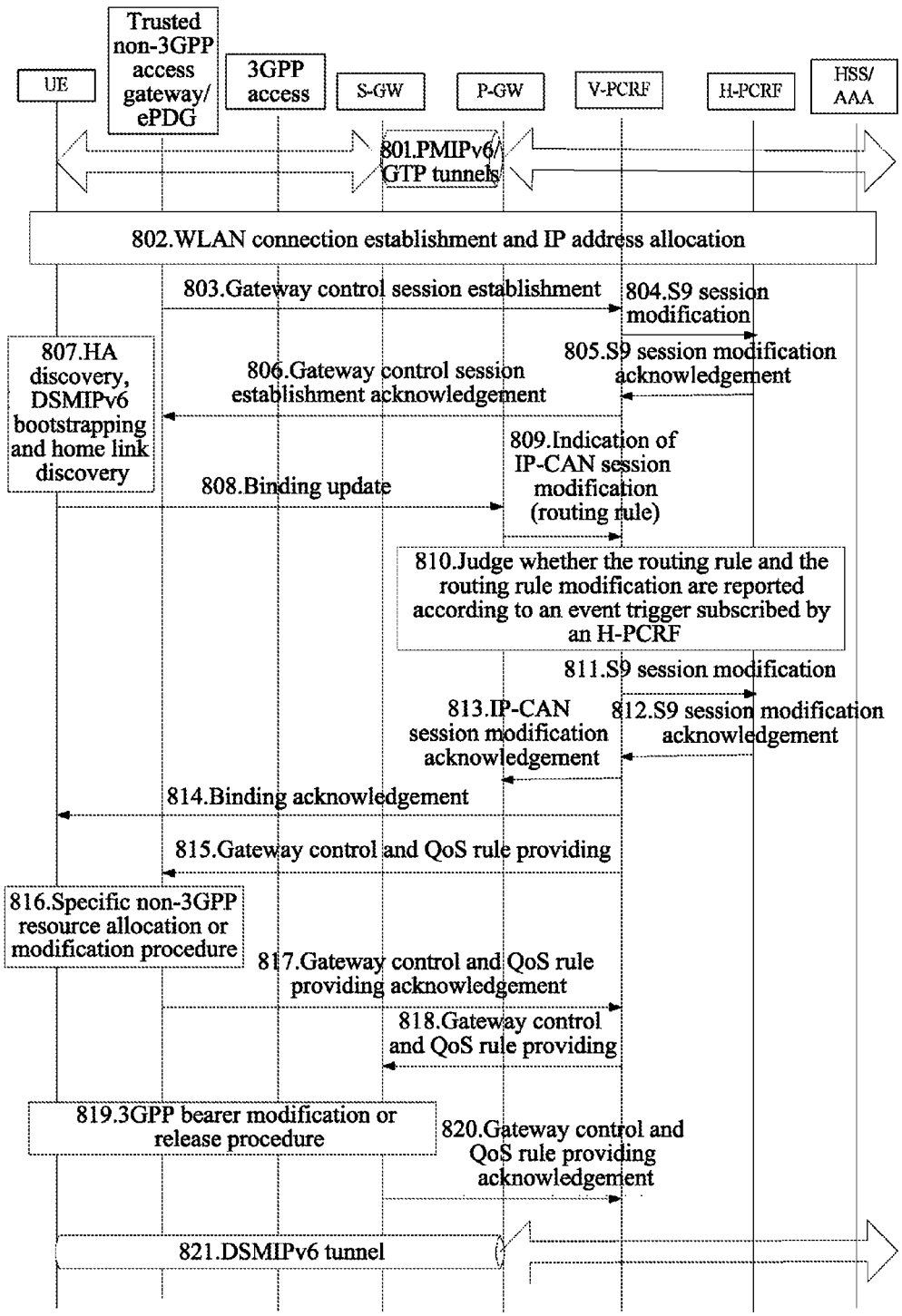
FIG. 8 is a flow diagram of the example 2 of the present document.

FIG. 8 is a flow diagram of the example of the present document, wherein a UE firstly establishes a PDN connection when accessing through a 3GPP access network and then establishes the same PDN connection through a non-3GPP access, and adopts the two accesses simultaneously to use the PDN connection. Dynamic PCC is deployed in the network. In the figure, the UE uses a DSMIPv6 protocol when accessing through a trusted non-3GPP access network.

In step 801, the UE accesses an EPC through the 3GPP access network, wherein, a tunnel is established between the S-GW and the P-GW through a GTP or a PMIPv6 protocol, and there are services which have been transmitted on the tunnel.

In step 802, the UE discovers a non-3GPP access network and decides to initiate multiple accesses. If the non-3GPP access network is trusted, the UE executes an access authentication and authorization in a trusted non-3GPP access network, and the UE executes a layer 3 attachment and obtains a local IP address (i.e. an IP address1) to serve as a CoA. If the non-3GPP access network is un-trusted, an IPSec tunnel will be established between the UE and an ePDG, and in the tunnel establishment process, the ePDG allocates the IP address1 to the UE to serve as the CoA.

In step 803, a BBERF located in the trusted non-3GPP access network or ePDG sends gateway control session establishment message to a V-PCRF and requests for establishing a gateway control session, wherein a user identifier and the IP address1 are carried.

In step 804, the V-PCRF associates the gateway control session with an S9 session established previously according to the user identifier, the V-PCRF sends an S9 session modification to an H-PCRF, wherein the IP Address1 is carried.

In step 805, since there is no PDN identifier information at the point, a policy made by the H-PCRF will not aim at a certain PDN. The policy made by the H-PCRF may include a QoS rule. The H-PCRF returns S9 session modification acknowledgment message to the V-PCRF, wherein the QoS rule may be carried.

In step 806, the V-PCRF returns the acknowledgement message to the BBERF.

In step 807, the UE discovers a P-GW selected during the 3GPP access through a bootstrapping process of the Mobile IPv6. A security association is established between the UE and an PDN. The UE uses an IKEv2 to initiate a security association establishment. An EAP is used for authentication on the IKEv2. The P-GW interacts with AAA to complete an EAP authentication. Moreover, in the process, the P-GW returns an IP Address2 allocated by the P-GW during the 3GPP access of the UE, and the UE uses the IP address as an HoA during the DSMIPv6 binding. At this point, the P-GW functions as a HA.

In step 808, the UE sends DSMIPv6 binding update message to P-GW/HA, the binding update message carries (HoA, CoA, BID, FID). (HoA, CoA, BID, FID) are in a corresponding relationship. By the HoA taking a value of IP Address2 and the CoA taking a value of IP Address1, the message indicates that a corresponding BID is a binding accessing through non-3GPP, and a certain data flow of user access service identified uniquely by the FID is bound to a connection accessing through non-3GPP. By the HoA taking a value of IP Address2 and the CoA taking a value of IP Address2, the message indicates that a corresponding BID is a binding accessing through 3GPP, and a service data flow identified by the FID is bound to a connection accessing through 3GPP. If a flow binding is newly added, the corresponding relationship also includes Routing Filters (i.e. an IP quintuple) which are used for identifying a service data flow. A corresponding relationship is established between the FID and Routing Filters through the message, and a subsequent change of the service data flow can be indicated by the FID. The UE reports a default routing rule in the message, that is, the Routing Filters are a wildcard filter. The UE also can request for moving a Service Data Flow (SDF) transmitted through the 3GPP access to the non-3GPP access network.

In step 809, after receiving the binding update message, the P-GW/HA executes multi-registration flow binding according to the carried parameters such as the HoA, CoA, BID, FID and Routing Filters. That is, the P-GW maintains the GTP/PMIPv6 tunnels between the P-GW and S-GW and the DSMIPv6 tunnel between the P-GW and UE, and binds the service data flow to the 3GPP access or non-3GPP access. A PCEF located in the P-GW sends an Indication of IP-CAN session modification to the V-PCRF, and the PCEF will send event trigger ROUTING_RULE_CHANGE, and IP flow mobility routing rule information to the V-PCRF (with regard to this flow, the IP flow mobility routing rule information includes installing and/or modifying an IP flow mobility routing rule, the IP flow mobility routing rule is a corresponding relationship between the service data flow and the access, it is identified through a corresponding relationship between the Routing Filters and a Routing Address, when the Routing Address takes a value of IP Address1, it is indicated that it is accessed through non-3GPP, and when Routing Address takes a value of IP Address2, it is indicated that it is accessed through 3GPP). The message includes a default IP flow mobility routing rule, that is, the Routing Filters are a wildcard. If the UE moves a certain service data flow from the 3GPP access to the non-3GPP access, the PCEF will provide an IP flow mobility routing rule corresponding to the service data flow to the PCRF, so as to inform the V-PCRF of the mobility which occurs in a route of the service data flow. In the routing rule, the Routing Filters are an IP quintuple of the service data flow, and the Routing Address takes a value of IP Address1.

In step 810, the V-PCRF installs or modifies the IP flow mobility routing rule carried in the IP flow mobility routing rule information. The V-PCRF judges whether it is required to report the IP flow mobility routing rule information to the H-PCRF according to an event trigger subscribed by the H-PCRF previously. If the values in the subscribed event trigger include the IP-CAN_CHANGE or the AN_G-W_CHANGE (that is, the H-PCRF subscribes to an IP-CAN_CHANGE event trigger or an AN_GW_CHANGE event trigger), the V-PCRF is required to report the IP flow mobility routing rule information and the ROUTING_RULE_CHANGE to the H-PCRF, otherwise the V-PCRF does not report the IP flow mobility routing rule information and the ROUTING_RULE_CHANGE to the H-PCRF but performs local handling of the visited network.

In step 811, if determining that the V-PCRF is required to report the IP flow mobility routing rule information and the ROUTING_RULE_CHANGE to the H-PCRF in step 810, the IP flow mobility routing rule information and the ROUTING_RULE_CHANGE are included into a Subsession corresponding to the IP-CAN session by the V-PCRF to be sent to the H-PCRF (that is, reporting ROUTING_RULE_CHANGE event trigger and installing and/or modifying the IP flow mobility routing rule to the H-PCRF), otherwise the IP flow mobility routing rule information and the ROUTING_RULE_CHANGE are not included into the Subsession by the V-PCRF to be sent to the H-PCRF.

In step 812, if the V-PCRF reports the IP flow mobility routing rule information and the ROUTING_RULE_CHANGE to the H-PCRF, the H-PCRF installs and/or modifies the IP flow mobility routing rule carried in the IP flow mobility routing rule information. If the mobility occurs in the service data flow corresponding to the IP flow mobility routing rule, the H-PCRF updates a corresponding PCC rule and returns the updated PCC rule to the V-PCRF.

In step 813, the V-PCRF returns acknowledgement message to the PCEF, and if the V-PCRF reports the IP flow mobility routing rule information and the ROUTING_RULE_CHANGE to the H-PCRF, the V-PCRF returns the updated PCC rule to the PCEF.

In step 814, the P-GW/HA returns binding acknowledgement message to the UE, the message carries the HoA, CoA, BID and FID to acknowledge that the multi-registry flow binding of the UE is successful or the multi-registration flow binding and IP flow mobility are successful.

In step 815, if the V-PCRF does not report the IP flow mobility routing rule information and the ROUTING_RULE_CHANGE to the H-PCRF, the V-PCRF performs local handling, and if the mobility occurs in the service data flow corresponding to the IP flow mobility routing rule, the V-PCRF makes a QoS rule according to a PCC rule corresponding to the IP flow mobility routing rule (these PCC rules are sent by the H-PCRF during the 3GPP access). If the V-PCRF reports the IP flow mobility routing rule information and the ROUTING_RULE_CHANGE to the H-PCRF, the V-PCRF makes a QoS rule according to a PCC rule newly sent by the H-PCRF. The V-PCRF provides the QoS rule to the BBERF in the trusted non-3GPP IP access network or ePDG.

In step 816, the BBERF installs the QoS rule, a specific flow of the non-3GPP access network is initiated to perform a resource allocation or modification.

In step 817, the BBERF returns the acknowledgement message to the V-PCRF.

In step 818, if the UE moves a certain service data flow from the 3GPP access to the non-3GPP access, and if the PMIPv6 tunnel is established between the S-GW and P-GW, the V-PCRF will delete the QoS rule corresponding to the service data flow. The V-PCRF provides a QoS rule required to be deleted to a BBERF in the S-GW through the gateway control session established during the UE accessing the 3GPP access network.

In step 819, the BBERF deletes the QoS rule, executes a 3GPP bearer modification procedure or a 3GPP bearer release procedure, and releases resources of the moved service data flow.

In step 820, the BBERF returns acknowledgement message to the V-PCRF.

If the GTP tunnel is established between the S-GW and P-GW, the P-GW will initiate the 3GPP bearer modification procedure or the 3GPP bearer release procedure after the step 813 and release resources of the moved service data flow. The steps 818-820 will not be executed.

In step 821, the UE completes the multi-registration flow binding and the possible flow mobility, the DSMIPv6 tunnel exists between the UE and P-GW/HA, and the GTP/PMIPv6 tunnels exist between the S-GW and P-GW. The UE or the network can decide an access through which service data are transmitted according to the policy.

Example 3

Figure 9:
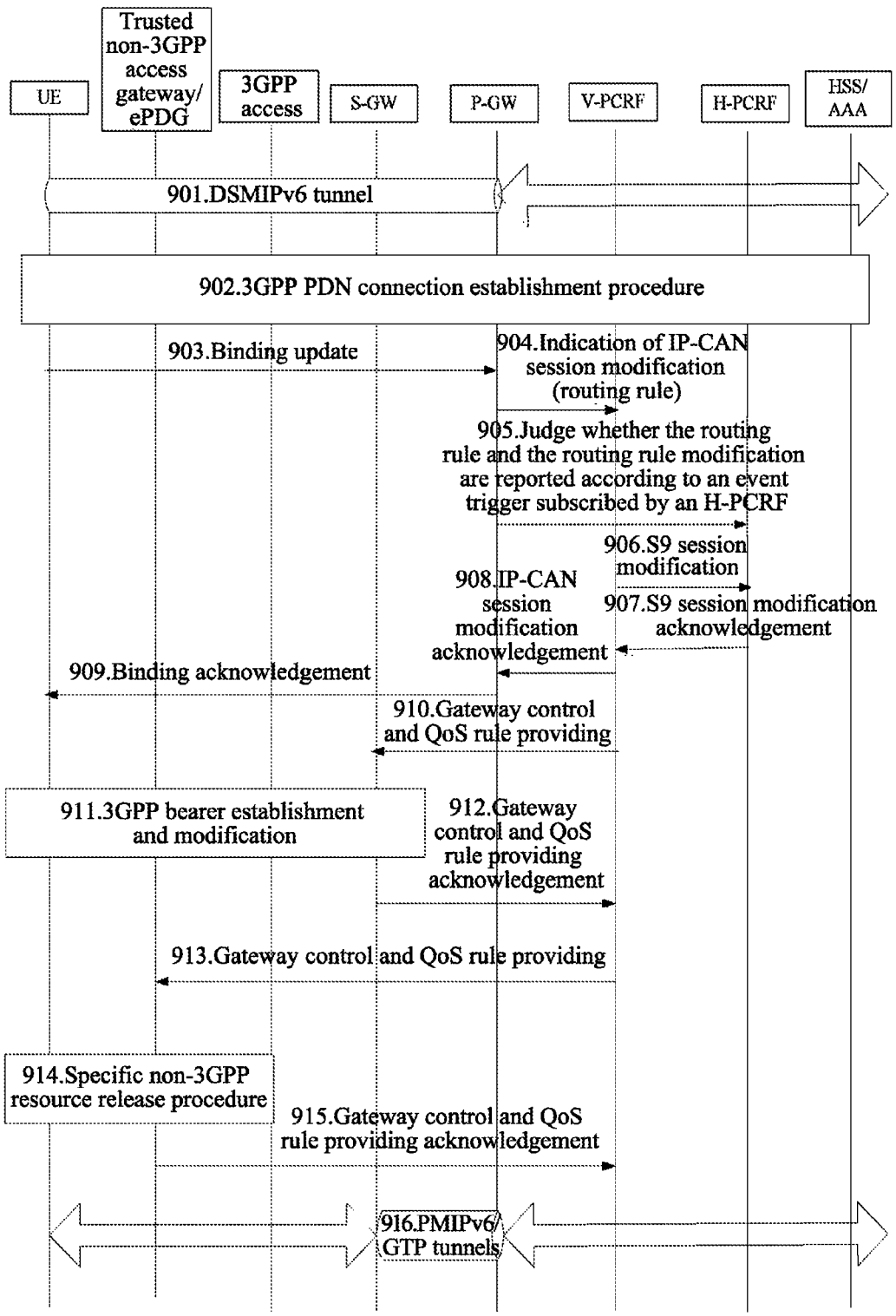
FIG. 9 is a flow diagram of the example 3 of the present document.

FIG. 9 is a flow diagram of the example of the present document, wherein a UE firstly establishes a PDN connection when accessing through a non-3GPP access network and then establishes the same PDN connection through a 3GPP access, and adopts the two accesses to use the PDN connection simultaneously according to the present document. Dynamic PCC is deployed in the network. In the figure, the UE uses a DSMIPv6 protocol when accessing through a trusted non-3GPP access network.

In step 901, the UE uses the DSMIPv6 protocol to access an EPC through the non-3GPP access network, a DSMIPv6 tunnel is established between the UE and P-GW/HA, and there are services which have been transmitted on the tunnel, wherein an address allocated by the non-3GPP access network to the UE is an IP Address1 serving as a CoA, and an IP address allocated by the P-GW to the UE is an IP Address2 serving as an HoA.

In step 902, the UE discovers a 3GPP access network and decides to initiate multiple accesses. The UE establishes a PDN connection to the same PDN through a 3GPP attachment flow, and in the establishment process, the IP address allocated by the P-GW to the UE is the IP Address2, so as to guarantee that the same PDN connection is established through different accesses.

In step 903, the UE sends DSMIPv6 binding update message to the P-GW/HA, the binding update message carries (HoA, CoA, BID, FID). (HoA, CoA, BID, FID) are in a corresponding relationship. By the HoA taking a value of IP Address2 and the CoA taking a value of IP Address1, the message indicates that a corresponding BID is a binding accessing through non-3GPP, and a certain data flow of user access service identified uniquely by the FID is bound to a connection accessing through non-3GPP. By the HoA taking a value of IP Address2 and the CoA taking a value of IP Address2, the message indicates that a corresponding BID is a binding accessing through 3GPP, and a service data flow identified by the FID is bound to a connection accessing through 3GPP. If a flow binding is newly added, the corresponding relationship also includes Routing Filters. A corresponding relationship is established between the FID and Routing Filters through the message, and a subsequent change of the service data flow can be represented by the FID. The UE may report a default routing rule in the message, that is, the Routing Filters are a wildcard filter. The UE also can request for moving a Service Data Flow (SDF) transmitted through the non-3GPP access to the 3GPP access network.

In step 904, after receiving the binding update message, the P-GW/HA executes multi-registration flow binding according to the carried parameters such as the HoA, CoA, BID, FID and Routing Filters. That is, the P-GW maintains the GTP/PMIPv6 tunnels between the P-GW and S-GW and the DSMIPv6 tunnel between the P-GW and UE simultaneously, and binds the service data flow to the 3GPP access or non-3GPP access. A PCEF located in the P-GW sends an Indication of IP-CAN session modification to a V-PCRF, and the PCEF will send event trigger ROUTING_RULE_CHANGE, and IP flow mobility routing rule information to the V-PCRF (with regard to the flow, the IP flow mobility routing rule information is installing and/or modifying an IP flow mobility routing rule, the IP flow mobility routing rule is a corresponding relationship between the service data flow and the access, it is identified through a corresponding relationship between the Routing Filters and a Routing Address, when the Routing Address takes a value of IP Address1, it is indicated that it is accessed through non-3GPP, and when Routing Address takes a value of IP Address2, it is indicated that it is accessed through 3GPP). The message may include a default IP flow mobility routing rule, that is, the Routing Filters are a wildcard. If the UE moves a certain service data flow from the non-3GPP access to the 3GPP access, the PCEF will provide an IP flow mobility routing rule corresponding to the service data flow to the V-PCRF, so as to inform the V-PCRF of the mobility which occurs in a route of the service data flow. In the routing rule, the Routing Filters are an IP quintuple of the service data flow, and the Routing Address takes a value of IP Address2.

In step 905, the V-PCRF installs and/or modifies the IP flow mobility routing rule. The V-PCRF judges whether it is required to report the IP flow mobility routing rule information to an H-PCRF according to an event trigger subscribed by the H-PCRF previously. If the values in the subscribed event trigger include IP-CAN_CHANGE or AN_G-W_CHANGE (that is, the H-PCRF subscribes to an IP-CAN_CHANGE event trigger or an AN_GW_CHANGE event trigger), the V-PCRF is required to report the IP flow mobility routing rule information and the ROUTING_RULE_CHANGE to the H-PCRF, otherwise the V-PCRF does not report the IP flow mobility routing rule information and the ROUTING_RULE_CHANGE to the H-PCRF but performs local handling of the visited network.

In step 906, if determining that the V-PCRF is required to report the IP flow mobility routing rule information and the ROUTING_RULE_CHANGE to the H-PCRF in step 905, the IP flow mobility routing rule information and the ROUTING_RULE_CHANGE are included into a Subsession corresponding to the IP-CAN session by the V-PCRF to be sent to the H-PCRF (that is, reporting ROUTING_RULE_CHANGE event trigger and installing and/or modifying the IP flow mobility routing rule to the H-PCRF), otherwise the IP flow mobility routing rule information and the ROUTING_RULE_CHANGE are not included into the Subsession by the V-PCRF to be sent to the H-PCRF.

In step 907, if the V-PCRF reports the IP flow mobility routing rule information and the ROUTING_RULE_CHANGE to the H-PCRF, the H-PCRF installs and/or modifies the IP flow mobility routing rule. If the mobility occurs in the service data flow corresponding to the IP flow mobility routing rule, the H-PCRF updates a corresponding PCC rule according to the IP flow mobility routing rule and returns the updated PCC rule to the V-PCRF.

In step 908, the V-PCRF returns acknowledgement message to the PCEF, and if the V-PCRF reports the IP flow mobility routing rule information and the ROUTING_RULE_CHANGE to the H-PCRF, the V-PCRF returns the updated PCC rule to the PCEF.

In step 909, the P-GW/HA returns binding acknowledgement message to the UE, the message carries the HoA, CoA, BID and FID to acknowledge that the multi-registry flow binding of the UE is successful or the multi-registry flow binding and IP flow mobility are successful.

In step 910, if the V-PCRF does not report the IP flow mobility routing rule information and the ROUTING_RULE_CHANGE to the H-PCRF, the V-PCRF performs local handling, and if the mobility occurs in the service data flow corresponding to the IP flow mobility routing rule, the V-PCRF makes a QoS rule according to a PCC rule corresponding to the IP flow mobility routing rule (these PCC rules are sent by the H-PCRF during the non-3GPP access). If the V-PCRF reports the IP flow mobility routing rule information and the ROUTING_RULE_CHANGE to the H-PCRF, the V-PCRF makes a QoS rule according to a PCC rule newly sent by the H-PCRF. The V-PCRF provides the QoS rule to a BBERF in the S-GW.

In step 911, the BBERF installs the QoS rule, and the S-GW initiates and executes a 3GPP bearer modification procedure or a 3GPP bearer establishment procedure to perform a resource allocation or modification.

In step 912, the BBERF returns acknowledgement message to the V-PCRF.

If the GTP tunnel is established between the S-GW and P-GW, the P-GW will initiate the 3GPP bearer modification procedure or the 3GPP bearer establishment procedure after the step 908 and allocate resources of a service data flow moved in. The steps 910-912 will not be executed.

In step 913, if a certain service data flow moves from the non-3GPP access to the 3GPP access, the V-PCRF will delete the QoS rule corresponding to the service data flow in the non-3GPP access network or ePDG. The V-PCRF provides a QoS rule required to be deleted to the BBERF in the non-3GPP access network or ePDG through a gateway control session established by the UE during the non-3GPP access.

In step 914, the BBERF deletes the QoS rule, and a specific non-3GPP resource modification procedure or a specific non-3GPP resource release procedure is initiated and executed.

In step 915, the BBERF returns acknowledgement message to the V-PCRF.

In step 916, the UE completes the multi-registration flow binding and the flow mobility, the DSMIPv6 tunnel exists between the UE and P-GW/HA, and the GTP/PMIPv6 tunnels exist between the S-GW and P-GW. The UE or the network can decide an access through which service data are transmitted according to the policy.

Example 4

Figure 10:
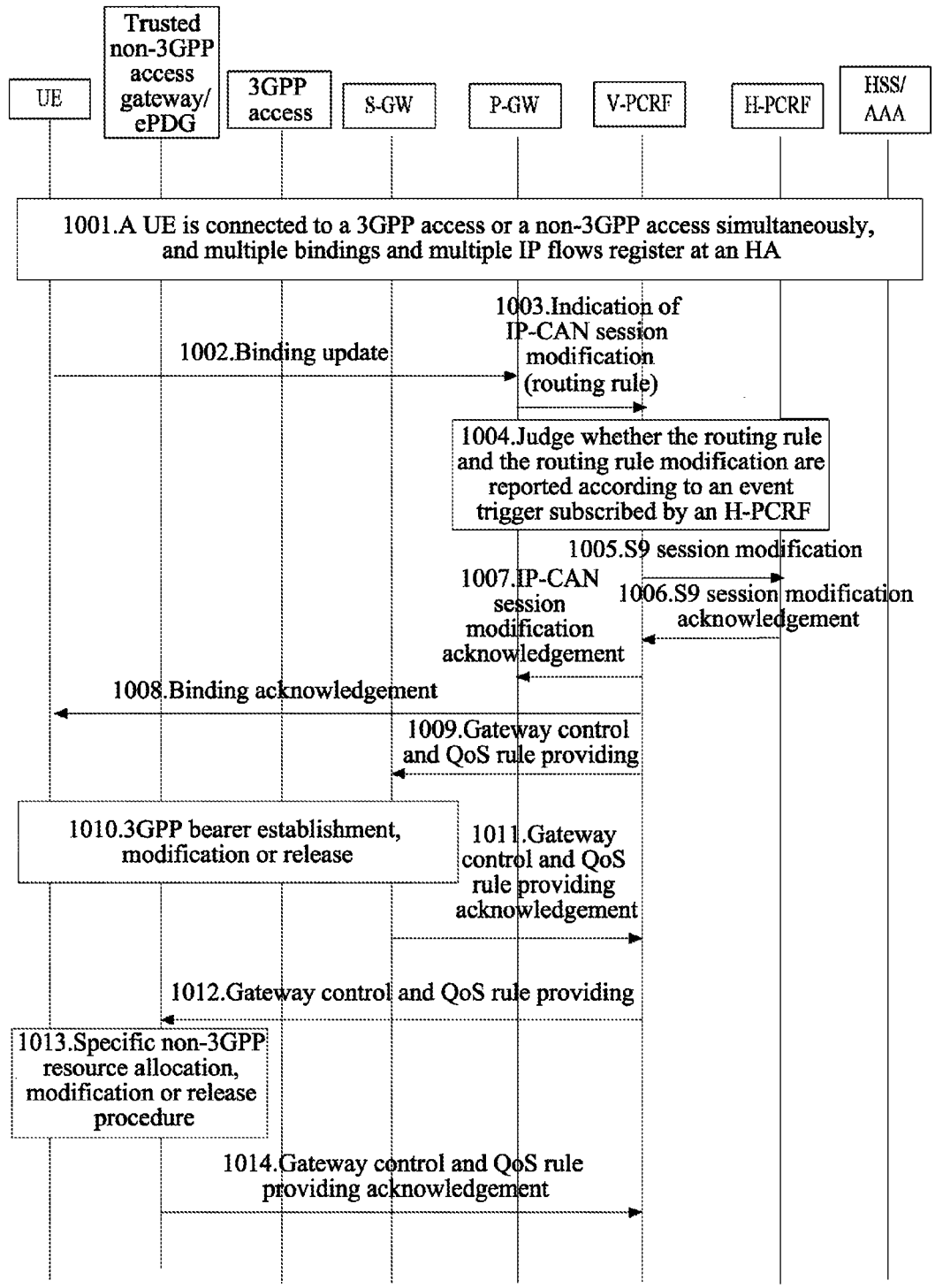
FIG. 10 is a flow diagram of the example 4 of the present document.

FIG. 10 is a flow diagram of a UE performing data flow mobility, service data flow addition or service data flow deletion between two access networks after implementing the multi-registry flow binding through the flow of FIG. 8 or FIG. 9 according to the present document. Dynamic PCC is deployed in the network.

In step 1001, the UE is connected to a 3GPP access and a non-3GPP access simultaneously through the flow of FIG. 8 or FIG. 9 and performs multi-registry flow binding.

In step 1002, the UE sends DSMIPv6 binding update message to P-GW/HA, and the binding update message carries (HoA, BID, FID). In the message, the UE can request for moving a Service Data Flow (SDF) transmitted through the non-3GPP access (represented as the FID) to a 3GPP access network (represented as the BID) or vice versa (that is, a routing rule is changed). The UE also can request for deleting the routing rule or adding a routing rule. If a routing rule is newly added, the message also includes Routing Filters.

In step 1003, after receiving the binding update message, the P-GW/HA executes flow binding updating including the flow mobility, new addition or deletion and so on according to the carried parameters such as the HoA, BID and FID. A PCEF located in the P-GW sends an Indication of IP-CAN session modification to a V-PCRF, and the PCEF will send event trigger ROUTING_RULE_CHANGE, and IP flow mobility routing rule information which includes installing, modifying and/or removing an IP flow mobility routing rule to the V-PCRF. In the routing rule, an IP Address1 is adopted to indicate that an access network performing transmission currently is of non-3GPP, and an IP Address2 is adopted to indicate that an access network performing transmission currently is of 3GPP. The Routing Filters are adopted to indicate service data flows.

In step 1004, the V-PCRF installs, modifies and/or deletes the IP flow mobility routing rule. The V-PCRF judges whether it is required to report the IP flow mobility routing rule information to an H-PCRF according to an event trigger subscribed by the H-PCRF previously. If the values in the subscribed event trigger include IP-CAN_CHANGE or AN_GW_CHANGE (that is, the H-PCRF subscribes to an IP-CAN_CHANGE event trigger or an AN_GW_CHANGE event trigger), the V-PCRF is required to report the IP flow mobility routing rule information and the ROUTING_RULE_CHANGE to the H-PCRF, otherwise the V-PCRF does not report the IP flow mobility routing rule information and the ROUTING_RULE_CHANGE to the H-PCRF but performs local handling of the visited network.

In step 1005, if determining that the V-PCRF is required to report the IP flow mobility routing rule information and the ROUTING_RULE_CHANGE to the H-PCRF in step S1004, the IP flow mobility routing rule information and the ROUTING_RULE_CHANGE are included into a Subsession corresponding to the IP-CAN session by the V-PCRF to be sent to the H-PCRF (that is, reporting ROUTING_RULE_CHANGE event trigger and installing, modifying and/or removing the IP flow mobility routing rule to the H-PCRF), otherwise the IP flow mobility routing rule information and the ROUTING_RULE_CHANGE are not included into the Subsession by the V-PCRF to be sent to the H-PCRF.

In step 1006, if the V-PCRF reports the IP flow mobility routing rule information and the ROUTING_RULE_CHANGE to the H-PCRF, the H-PCRF installs, modifies and/or deletes the IP flow mobility routing rule. If the mobility occurs in the service data flow corresponding to the IP flow mobility routing rule, the H-PCRF updates a corresponding PCC rule and returns the updated PCC rule to the V-PCRF.

In step 1007, the V-PCRF returns acknowledgement message to the PCEF, and if the V-PCRF reports the IP flow mobility routing rule information and the ROUTING_RULE_CHANGE to the H-PCRF, the acknowledgement message returned by the V-PCRF to the PCEF includes the updated PCC rule.

In step 1008, the P-GW/HA returns binding acknowledgement message to the UE, the message carries the HoA, BID and FID to acknowledge that the routing rule update of the UE is successful, that is, the flow mobility is successful.

In step 1009, if a PMIPv6 tunnel is established between the S-GW and P-GW, the V-PCRF will install or delete a QoS rule on a BBERF in the S-GW according to the rule reported by the PCEF. If it is to move from the non-3GPP to the 3GPP, the QoS rule is installed, and conversely, the QoS rule is deleted. If the V-PCRF does not report the IP flow mobility routing rule and the ROUTING_RULE_CHANGE to the H-PCRF, the V-PCRF performs local handling, and if the mobility occurs in the service data flow corresponding to the IP flow mobility routing rule and it is required to install the QoS rule, a QoS rule is made according to a PCC rule corresponding to the IP flow mobility routing rule. Here, the PCC rule is a PCC rule locally saved by the V-PCRF, the PCC rule is sent by the H-PCRF previously, and it may be sent by the H-PCRF during the non-3GPP access, or it may be sent by the H-PCRF during the 3GPP access, or it may be sent by the H-PCRF in other processes. If the V-PCRF reports the IP flow mobility routing rule information and the ROUTING_RULE_CHANGE to the H-PCRF, the V-PCRF makes a QoS rule according to a PCC rule newly sent by the H-PCRF, and the V-PCRF provides the QoS rule to the BBERF in the S-GW. If it is required to delete the QoS rule, the V-PCRF requests the BBERF to delete the QoS rule corresponding to the service data flow moved away from the 3GPP access.

In step 1010, the BBERF installs or deletes the QoS rule, and the S-GW initiates and executes a 3GPP bearer establishment procedure, a 3GPP bearer modification procedure or a 3GPP bearer deletion procedure to perform a resource allocation, modification or release.

In step 1011, the BBERF returns acknowledgement message to the V-PCRF.

If the GTP tunnel is established between the S-GW and P-GW, the P-GW will initiate the 3GPP bearer establishment procedure, 3GPP bearer modification procedure or 3GPP bearer deletion procedure after the step 1007. The steps 1009-1011 will not be executed.

In step 1012, the V-PCRF will install or delete a QoS rule on a BBERF in the trusted non-3GPP access network or ePDG according to the IP flow mobility routing rule information reported by the PCEF. If it is to move from the 3GPP to the non-3GPP, the QoS rule is installed, and conversely, the QoS rule is deleted. If the V-PCRF does not report the IP flow mobility routing rule and the ROUTING_RULE_CHANGE to the H-PCRF, the V-PCRF performs local handling, and if the mobility occurs in the service data flow corresponding to the IP flow mobility routing rule and it is required to install the QoS rule, the QoS rule is made according to a PCC rule corresponding to the IP flow mobility routing rule. Here, the PCC rule is a PCC rule locally saved by the V-PCRF, the PCC rule is sent by the H-PCRF previously, and it may be sent by the H-PCRF during the non-3GPP access, or it may be sent by the H-PCRF during the 3GPP access, or it may be sent by the H-PCRF in other processes. If the V-PCRF reports the IP flow mobility routing rule information and the ROUTING_RULE_CHANGE to the H-PCRF, the V-PCRF makes a QoS rule according to a PCC rule newly sent by the H-PCRF, and the V-PCRF provides the QoS rule to the BBERF in the trusted non-3GPP access network or ePDG. If it is required to delete the QoS rule, the V-PCRF requests the BBERF to delete the QoS rule corresponding to the service data flow moved away from the non-3GPP access.

In step 1013, the BBERF installs or deletes the QoS rule, and a specific non-3GPP resource allocation procedure, a specific non-3GPP resource modification procedure or a specific non-3GPP resource release procedure is initiated and executed.

In step 1014, the BBERF returns acknowledgement message to the V-PCRF.

The present document further provides a policy and charging control system for supporting IP flow mobility in a roaming scenario, which comprises: a Visited Policy and Charging Rules Function (V-PCRF) and a Home Policy and Charging Rules Function (H-PCRF), wherein:

the V-PCRF is configured to: when receiving IP flow mobility routing rule information reported by a Policy and Charging Enforcement Function (PCEF), and if the H-PCRF subscribes to an IP-CAN Type Change (IP-CAN_CHANGE) event trigger or to an Access Node Gateway Change (AN_G-W_CHANGE) event trigger, report the IP flow mobility routing rule information to the H-PCRF, and the IP flow mobility routing rule information includes: installing, modifying or removing an IP flow mobility routing rule.

Wherein, the V-PCRF is also configured to: after receiving the IP flow mobility routing rule information, execute one or more of the following operations: installing, modifying or removing the IP flow mobility routing rule carried in the IP flow mobility routing rule information.

Wherein, the H-PCRF is also configured to: in an IP-Connectivity Access Network (IP-CAN) session establishment process, after receiving the IP flow mobility routing rule information, install the IP flow mobility routing rule carried in the IP flow mobility routing rule information.

Wherein, the V-PCRF is also configured to: in an IP-CAN session modification process, when reporting the IP flow mobility routing rule information to the H-PCRF, report ROUTING_RULE_CHANGE event trigger to the H-PCRF.

Wherein, the H-PCRF is also configured to: in the IP-CAN session modification process, after receiving the IP flow mobility routing rule information, execute one or more of the following operations: installing, modifying or removing the IP flow mobility routing rule carried in the IP flow mobility routing rule information.

Wherein, the H-PCRF is further configured to: after installing or modifying the IP flow mobility routing rule, if the mobility occurs in a service data flow corresponding to the IP flow mobility routing rule, update a PCC rule, and send the updated PCC rule to the V-PCRF;

the V-PCRF is also configured to send the updated PCC rule to the PCEF.

Wherein, the V-PCRF is further configured to: make a QoS rule according to the updated PCC rule, and send the QoS rule to a specified BBERF according to the IP flow mobility routing rule.

Wherein, the V-PCRF is further configured to: delete a QoS rule corresponding to the service data flow from a BBERF through which the service data flow passes before the mobility.

Wherein, the V-PCRF is further configured to: if the H-PCRF does not subscribe to the IP-CAN_CHANGE event trigger or the AN_GW_CHANGE event trigger, handles the IP flow mobility locally.

Wherein, the V-PCRF handling the IP flow mobility locally includes: if the mobility occurs in the service data flow corresponding to the IP flow mobility routing rule, the V-PCRF making a QoS rule according to a PCC rule corresponding to the IP flow mobility routing rule, and sending the QoS rule to a specified BBERF according to the IP flow mobility routing rule.

Wherein, the V-PCRF handling the IP flow mobility locally also includes: deleting the QoS rule corresponding to the service data flow from the BBERF through which the service data flow passes before the mobility.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, or they can be made into multiple integrated circuit modules respectively or multiple modules, or steps of them can be made into a single integrated circuit module to be implemented. Therefore, the present document is not limited to any combination of hardware and software in a specific form.

The above description is only the preferred examples of the present document, which is not used to limit the present document. The present document can have various changes and changes for the skilled in the art. All the changes, equivalent substitutions, and improvements, etc. made within the spirit and principle of the present document shall fall into the protection scope of the present document.

INDUSTRIAL APPLICABILITY

Through the examples of the present document, it can implement the following beneficial effects:

1) when the H-PCRF does not support the IP flow mobility, and if the H-PCRF does not subscribe to the IP-CAN_CHANGE or the AN_GW_CHANGE, a visited network can execute the IP flow mobility locally;

2) when the H-PCRF supports the IP flow mobility, and if the H-PCRF does not subscribe to the IP-CAN_CHANGE or the AN_GW_CHANGE, the V-PCRF is not required to interact with the H-PCRF, compared with a scheme in which an interaction with the H-PCRF is required at any time, signaling overhead between the V-PCRF and the H-PCRF can be saved.

What is claimed is:

1. A policy and charging control method for supporting IP flow mobility in a roaming scenario, comprising:

sending by a Home Policy and Charging Rules Function (H-PCRF), an event trigger to a Visited Policy and Charging Rules Function (V-PCRF);

when the V-PCRF receives IP flow mobility routing rule information reported by a Policy and Charging Enforcement Function (PCEF), and if the H-PCRF subscribes to an IP Connectivity Access Network type change (IP-CAN_CHANGE) event trigger or to an access node gateway change (AN_GW_CHANGE) event trigger, reporting by the V-PCRF, the IP flow mobility routing rule information to the H-PCRF;

if the H-PCRF does not subscribe to the IP-CAN_CHANGE event trigger or the AN_GW_CHANGE event trigger, handling, by the V-PCRF, the IP flow mobility locally, which comprises:

when mobility occurs in a service data flow corresponding to an IP flow mobility routing rule carried in the IP flow mobility routing rule information, the V-PCRF makes a Quality of Service (QoS) rule according to a Policy and Charging Control (PCC) rule corresponding to the IP flow mobility routing rule, and sends the QoS rule to a specified Bearer Binding and Event Reporting Function (BBERF) according to the IP flow mobility routing rule, wherein the PCC rule is sent by the H-PCRF during a 3GPP access or non-3GPP access;

wherein the IP flow mobility routing rule information comprises: installing, modifying or removing the IP flow mobility routing rule, and the IP flow mobility routing rule is a corresponding relationship between a service data flow and the 3GPP access or non-3GPP access;
wherein, the H-PCRF subscribes to the IP-CAN_CHANGE event trigger or to the AN_GW_CHANGE event trigger by including an IP-CAN_CHANGE or an AN_GW_CHANGE in the values of the event trigger being sent to the V-PCRF.

2. The method according to claim 1, wherein, in an IP-CAN session establishment process, after receiving the IP flow mobility routing rule information, installing, by the H-PCRF, the IP flow mobility routing rule carried in the IP flow mobility routing rule information.

3. The method according to claim 1, wherein,
in an IP-CAN session modification process, when reporting the IP flow mobility routing rule information to the H-PCRF, the V-PCRF further reports ROUTING_RULE_CHANGE event trigger to the H-PCRF.

4. The method according to claim 3, further comprising:
in the IP-CAN session modification process, after receiving the IP flow mobility routing rule information, executing, by the H-PCRF, one or more of the following operations: installing, modifying or removing the IP flow mobility routing rule carried in the IP flow mobility routing rule information.

5. The method according to claim 4, further comprising:
after installing, modifying or removing the IP flow mobility routing rule, when the mobility occurs in a service data flow corresponding to the IP flow mobility routing rule, updating, by the H-PCRF, the PCC rule, and sending the updated PCC rule to the V-PCRF;
the V-PCRF sending the updated PCC rule to the PCEF.

6. The method according to claim 5, further comprising:
making, by the V-PCRF, the QoS rule according to the updated PCC rule, and sending the QoS rule to a specified Bearer Binding and Event Reporting Function (BBERF) according to the IP flow mobility routing rule.

7. The method according to claim 6, further comprising:
deleting, by the V-PCRF, the QoS rule corresponding to the service data flow from a BBERF through which the service data flow passes before the mobility.

8. The method according to claim 1, wherein, handling by the V-PCRF, the IP flow mobility locally further comprises:
the V-PCRF deleting a QoS rule corresponding to the service data flow from a BBERF through which the service data flow passes before the mobility.

9. A policy and charging control system for supporting IP flow mobility in a roaming scenario, comprising: a Visited Policy and Charging Rules Function (V-PCRF) and a Home Policy and Charging Rules Function (H-PCRF), wherein:
the H-PCRF is configured to: send an event trigger to the V-PCRF;
the V-PCRF is configured to: when receiving IP flow mobility routing rule information reported by a Policy and Charging Enforcement Function (PCEF), and if the H-PCRF subscribes to an IP Connectivity Access Network type change (IP-CAN_CHANGE) event trigger or to an access node gateway change (AN_GW_CHANGE) event trigger, report the IP flow mobility routing rule information to the H-PCRF, if the H-PCRF does not subscribe to the IP-CAN_CHANGE event trigger or the AN_GW_CHANGE event trigger, handle the IP flow mobility locally, wherein the V-PCRF is configured to handle the flow mobility locally wherein:
when mobility occurs in a service data flow corresponding to an IP flow mobility routing rule carried in the IP flow mobility routing rule information, the V-PCRF makes a Quality of Service (QoS) rule according to a Policy and Charging Control (PCC) rule corresponding to the IP flow mobility routing rule, and sends the QoS rule to a specified Bearer Binding and Event Reporting Function (BBERF) according to the IP flow mobility routing rule, or deletes the QoS rule corresponding to the service data flow from a BBERF through which the service data flow passes before the mobility, wherein the PCC rule is sent by the H-PCRF during a 3GPP access or non-3GPP access;
wherein the IP flow mobility routing rule information comprises: installing, modifying or removing the IP flow mobility routing rule, and the IP flow mobility routing rule is a corresponding relationship between a service data flow and the 3GPP access or non-3GPP access;
wherein, the H-PCRF subscribes to the IP-CAN_CHANGE event trigger or to the AN_GW_CHANGE event trigger by including an IP-CAN_CHANGE or an AN_GW_CHANGE in the values of the event trigger being sent to the V-PCRF.

10. The system according to claim 9, wherein,
the H-PCRF is further configured to: in an IP-CAN session establishment process, after receiving the IP flow mobility routing rule information, install the IP flow mobility routing rule carried in the IP flow mobility routing rule information.

11. The system according to claim 9, wherein,
the V-PCRF is further configured to: in an IP-CAN session modification process, when reporting the IP flow mobility routing rule information to the H-PCRF, report ROUTING_RULE_CHANGE event trigger to the H-PCRF.

12. The system according to claim 11, wherein,
the H-PCRF is further configured to: in the IP-CAN session modification process, after receiving the IP flow mobility routing rule information, execute one or more of the following operations: installing, modifying or removing the IP flow mobility routing rule carried in the IP flow mobility routing rule information.

13. The system according to claim 12, wherein,
the H-PCRF is further configured to: after installing or modifying the IP flow mobility routing rule, when the mobility occurs in a service data flow corresponding to the IP flow mobility routing rule, update a PCC rule, and send the updated PCC rule to the V-PCRF;
the V-PCRF is further configured to: send the updated PCC rule to the PCEF.

14. The system according to claim 13, wherein
the V-PCRF is further configured to: make a QoS rule according to the updated PCC rule, and send the QoS rule to a specified BBERF according to the IP flow mobility routing rule.

15. The system according to claim 14, wherein
the V-PCRF is further configured to: delete a QoS rule corresponding to the service data flow from a BBERF through which the service data flow passes before the mobility.

16. A Visited Policy and Charging Rules Function (V-PCRF), wherein, the V-PCRF is configured to: receive an event trigger sent by a Home Policy and Charging Rules Function (H-PCRF); when receiving IP flow mobility routing rule information reported by a Policy and Charging Enforcement Function (PCEF), and if the H-PCRF subscribes to an IP Connectivity Access Network type change (IP-CAN_CHANGE) event trigger or to an access node gateway change (AN_GW_CHANGE) event trigger, report the IP flow mobility routing rule information to the H-PCRF; if the H-PCRF does not subscribe to the IP-CAN_CHANGE event trigger or the AN_GW_CHANGE event trigger, handle the IP flow mobility locally, wherein the V-PCRF is configured to handle the IP flow mobility locally wherein:

when mobility occurs in a service data flow corresponding to an IP flow mobility routing rule carried in the IP flow mobility routing rule information, the V-PCRF makes a Quality of Service (QoS) rule according to a Policy and Charging Control (PCC) rule corresponding to the IP flow mobility routing rule, and sends the QoS rule to a specified Bearer Binding and Event Reporting Function (BBERF) according to the IP flow mobility routing rule, or deletes the QoS rule corresponding to the service data flow from a BBERF through which the service data flow passes before the mobility, wherein the PCC rule is sent by the H-PCRF during a 3GPP access or non-3GPP access;

wherein the IP flow mobility routing rule information comprises: installing, modifying or removing the IP flow mobility routing rule, and the IP flow mobility routing rule is a corresponding relationship between a service data flow and the 3GPP access or non-3GPP access;

wherein, the H-PCRF subscribes to the IP-CAN_CHANGE event trigger or to the AN_GW_CHANGE event trigger by including an IP-CAN_CHANGE or an AN_GW_CHANGE in the values of the event trigger being sent to the V-PCRF.

17. The V-PCRF according to claim 16, wherein, the V-PCRF is further configured to: in an IP-CAN session modification process, when reporting the IP flow mobility routing rule information to the H-PCRF, report ROUTING_RULE_CHANGE event trigger to the H-PCRF.

18. The V-PCRF according to claim 16, wherein, the V-PCRF is further configured to: send an updated PCC rule to the PCEF;

after the H-PCRF installs or modifies the IP flow mobility routing rule, and when the mobility occurs in a service data flow corresponding to the IP flow mobility routing rule, the updated PCC rule is obtained by the H-PCRF updating a PCC rule; and the H-PCRF sends the updated PCC rule to the V-PCRF.

19. The V-PCRF according to claim 18, wherein the V-PCRF is further configured to: make a QoS rule according to the updated PCC rule, and send the QoS rule to a specified BBERF according to the IP flow mobility routing rule.

20. The V-PCRF according to claim 19, wherein the V-PCRF is further configured to: delete a QoS rule corresponding to the service data flow from a BBERF through which the service data flow passes before the mobility.

* * * * *